(12) United States Patent
Ogawa et al.

(10) Patent No.: US 9,406,950 B2
(45) Date of Patent: Aug. 2, 2016

(54) FUEL CELL MODULE

(71) Applicant: HONDA MOTOR CO., LTD., Tokyo (JP)

(72) Inventors: Tetsuya Ogawa, Wako (JP); Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/438,332

(22) PCT Filed: Oct. 7, 2013

(86) PCT No.: PCT/JP2013/077687
§ 371 (c)(1),
(2) Date: Apr. 24, 2015

(87) PCT Pub. No.: WO2014/073321
PCT Pub. Date: May 15, 2014

(65) Prior Publication Data
US 2015/0270560 A1    Sep. 24, 2015

(30) Foreign Application Priority Data

Nov. 7, 2012   (JP) ................................. 2012-245364

(51) Int. Cl.
| | |
|---|---|
| *H01M 8/04* | (2016.01) |
| *H01M 8/06* | (2016.01) |
| *H01M 8/12* | (2016.01) |
| *H01M 8/24* | (2016.01) |
| *C01B 3/38* | (2006.01) |

(52) U.S. Cl.
CPC ........... *H01M 8/04022* (2013.01); *C01B 3/384* (2013.01); *H01M 8/04268* (2013.01);
(Continued)

(58) Field of Classification Search
CPC .............. C01B 3/384; C01B 2203/066; C01B 2203/0811; C01B 2203/1604; C01B 2203/0233; H01M 8/0612; H01M 8/04022; H01M 8/04268; H01M 8/0618; H01M 8/0662; H01M 8/1246; H01M 8/24; H01M 2008/1293; H01M 2250/20; Y02T 90/32; Y02E 60/50; Y02E 60/525; Y02E 60/324
See application file for complete search history.

(56) References Cited

U.S. PATENT DOCUMENTS

| | | |
|---|---|---|
| 9,240,601 B2 | 1/2016 | Yoshimine et al. |
| 2001/0009732 A1 | 7/2001 | Schuler |

(Continued)

FOREIGN PATENT DOCUMENTS

| | | |
|---|---|---|
| JP | 2001-236980 | 8/2001 |
| JP | 2004-288434 | 10/2004 |

(Continued)

OTHER PUBLICATIONS

U.S. Office Action dated Jan. 29, 2016, from co-pending U.S. Appl. No. 14/438,344, 26 pages.

(Continued)

*Primary Examiner* — Brittany Raymond
(74) *Attorney, Agent, or Firm* — Rankin, Hill & Clark LLP

(57) ABSTRACT

A fuel cell module includes a first area where an exhaust gas combustor and a start-up combustor are provided, an annular second area around the first area and where a reformer and an evaporator are provided, and an annular third area around the second area and where a heat exchanger is provided. A circumscribed non-uniform flow suppression plate is provided along the minimum circumscribed circle which is tangent to outer surfaces of heat exchange pipes of the heat exchanger.

7 Claims, 20 Drawing Sheets

(52) U.S. Cl.
CPC .......... *H01M 8/0612* (2013.01); *H01M 8/0618* (2013.01); *H01M 8/0662* (2013.01); *H01M 8/1246* (2013.01); *H01M 8/24* (2013.01); *C01B 2203/0233* (2013.01); *C01B 2203/066* (2013.01); *C01B 2203/0811* (2013.01); *C01B 2203/1604* (2013.01); *H01M 2008/1293* (2013.01); *H01M 2250/20* (2013.01); *Y02E 60/324* (2013.01); *Y02E 60/50* (2013.01); *Y02E 60/525* (2013.01); *Y02T 90/32* (2013.01)

(56) References Cited

U.S. PATENT DOCUMENTS

| | | |
|---|---|---|
| 2003/0161768 A1 | 8/2003 | Kawamoto et al. |
| 2010/0021784 A1 | 1/2010 | Fourmigue |

FOREIGN PATENT DOCUMENTS

| | | |
|---|---|---|
| JP | 2007-035387 | 2/2007 |
| JP | 2010-504607 | 2/2010 |
| JP | 2010-132551 | 6/2010 |

OTHER PUBLICATIONS

This application is co-pending with U.S. Appl. No. 14/438,339, which was filed in the United States Patent and Trademark Office on Apr. 24, 2015, and U.S. Appl. No. 14/438,344, which was filed in the United States Patent and Trademark Office on Apr. 24, 2015.

Japanese Office Action with partial English translation dated Aug. 11, 2015, 4 pages.

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. The solid electrolyte is interposed between an anode and a cathode to form an electrolyte electrode assembly (hereinafter also referred to as MEA). The electrolyte electrode assembly is sandwiched between separators (bipolar plates). In use, generally, predetermined numbers of the electrolyte electrode assemblies and the separators are stacked together to form a fuel cell stack.

As a system including this type of fuel cell stack, for example, a fuel cell battery disclosed in Japanese Laid-Open Patent Publication No. 2001-236980 (hereinafter referred to as the conventional technique 1) is known. As shown in FIG. 18, the fuel cell battery includes a fuel cell stack $1a$, and a heat insulating sleeve $2a$ is provided at one end of the fuel cell stack $1a$. A reaction device $4a$ is provided in the heat insulating sleeve $2a$. The reaction device $4a$ includes a heat exchanger $3a$.

In the reaction device $4a$, as a treatment of liquid fuel, partial oxidation reforming which does not use water is performed. After the liquid fuel is evaporated by an exhaust gas, the liquid fuel passes through a feeding point $5a$ which is part of the heat exchanger $3a$. The fuel contacts an oxygen carrier gas heated by the exhaust gas thereby to induce partial oxidation reforming, and then, the fuel is supplied to the fuel cell stack $1a$.

Further, as shown in FIG. 19, a solid oxide fuel cell disclosed in Japanese Laid-Open Patent Publication No. 2010-504607 (PCT) (hereinafter referred to as the conventional technique 2) has a heat exchanger $2b$ including a cell core $1b$. The heat exchanger $2b$ heats the cathode air utilizing waste heat.

Further, as shown in FIG. 20, a fuel cell system disclosed in Japanese Laid-Open Patent Publication No. 2004-288434 (hereinafter referred to as the conventional technique 3) includes a first area $1c$ having a circular cylindrical shape extending vertically, and an annular second area $2c$ around the first area $1c$, an annular third area $3c$ around the second area $2c$, and an annular fourth area $4c$ around the third area $3c$.

A burner $5c$ is provided in the first area $1c$, and a reforming pipe $6c$ is provided in the second area $2c$. A water evaporator $7c$ is provided in the third area $3c$, and a CO shift converter $8c$ is provided in the fourth area $4c$.

SUMMARY OF INVENTION

In the conventional technique 1, at the time of reforming by partial oxidation in the reaction device $4a$, heat of the exhaust gas is used for heating the liquid fuel and the oxygen carrier gas. Therefore, the quantity of heat for raising the temperature of the oxygen-containing gas supplied to the fuel cell stack $1a$ tends to be insufficient, and the efficiency is low. Further, since the heat exchanger $3a$ only heats the outer wall by the exhaust gas, a desired quantity of heat cannot be obtained. Further, non-uniform flow tends to be produced easily in the exhaust gas.

Further, in the conventional technique 2, in order to increase heat efficiency, long flow channels are adopted to have a sufficient heat transmission area. Therefore, considerably high pressure losses tend to occur. Moreover, since the heat exchanger $2b$ only heats the outer wall by the exhaust gas, a desired quantity of heat cannot be obtained. Further, non-uniform flow tends to be produced easily in the exhaust gas.

Further, in the conventional technique 3, radiation of the heat from the central area having the highest temperature is suppressed using heat insulation material (partition wall). Therefore, heat cannot be recovered, and the efficiency is low. Further, since the combustion gas flows along the partition wall, the effective quantity of heat cannot be obtained.

The present invention has been made to solve the problems of this type, and an object of the present invention is to provide a fuel cell module having simple and compact structure in which it is possible to achieve improvement in the heat efficiency and facilitation of thermally self-sustaining operation, and also it is possible to reliably suppress non-uniform flow of a combustion gas, whereby improvement in the heat exchange efficiency can be achieved suitably.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of water vapor and a raw fuel chiefly containing hydrocarbon to produce the fuel gas supplied to the fuel cell stack, an evaporator for evaporating water, and supplying the water vapor to the reformer, a heat exchanger for raising the temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

The fuel cell module includes a first area where the exhaust gas combustor and the start-up combustor are provided, an annular second area around the first area and where the reformer and the evaporator are provided, and an annular third area around the second area and where the heat exchanger is provided.

In the fuel cell module, the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber and another end connected to the oxygen-containing gas discharge chamber, and a combustion gas channel for supplying the combustion gas to spaces between the heat exchange pipes. A circumscribed non-uniform flow suppression plate is provided along the minimum circumscribed circle which is tangent to outer surfaces of the plurality of heat exchange pipes.

In the present invention, the first area including the exhaust gas combustor and the start-up combustor is centrally-located. The annular second area is successively provided around the first area, and the annular third area is then provided around the second area. The reformer and the evaporator are provided in the second area, and the heat exchanger is provided in the third area.

In the structure, heat waste and heat radiation are suppressed suitably. Thus, improvement in the heat efficiency is achieved, and thermally self-sustaining operation is facilitated. Further, simple and compact structure is achieved in the entire fuel cell module. The thermally self-sustaining operation herein means operation where the operating temperature of the fuel cell is maintained using only heat energy generated by the fuel cell itself, without supplying additional heat from the outside.

Further, in the heat exchanger, the annular oxygen-containing gas supply chamber, the annular oxygen-containing gas discharge chamber, and the heat exchange pipes are provided as basic structure. Thus, simple structure is achieved easily. Accordingly, the production cost is reduced effectively. Further, by changing the volumes of the oxygen-containing gas supply chamber and the oxygen-containing gas discharge chamber, the length, the diameter, and the number of the pipes, a desired operation can be achieved depending on various operating conditions, and a wider variety of designs become available.

Still further, the circumscribed non-uniform flow suppression plate is provided along the minimum circumscribed circle which is tangent to outer surfaces of the plurality of heat exchange pipes. Thus, by the guidance of the circumscribed non-uniform flow suppression plate, the combustion gas flows along the outer surfaces of the heat exchange pipes suitably. Thus, non-uniform flow and blow-through of the combustion gas are suppressed suitably, and the channel of the combustion gas can be sufficiently long. Accordingly, the quantity of the heat passed from the combustion gas to the oxygen-containing gas is increased, and improvement in the heat exchange efficiency is achieved suitably.

The above and other objects features and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
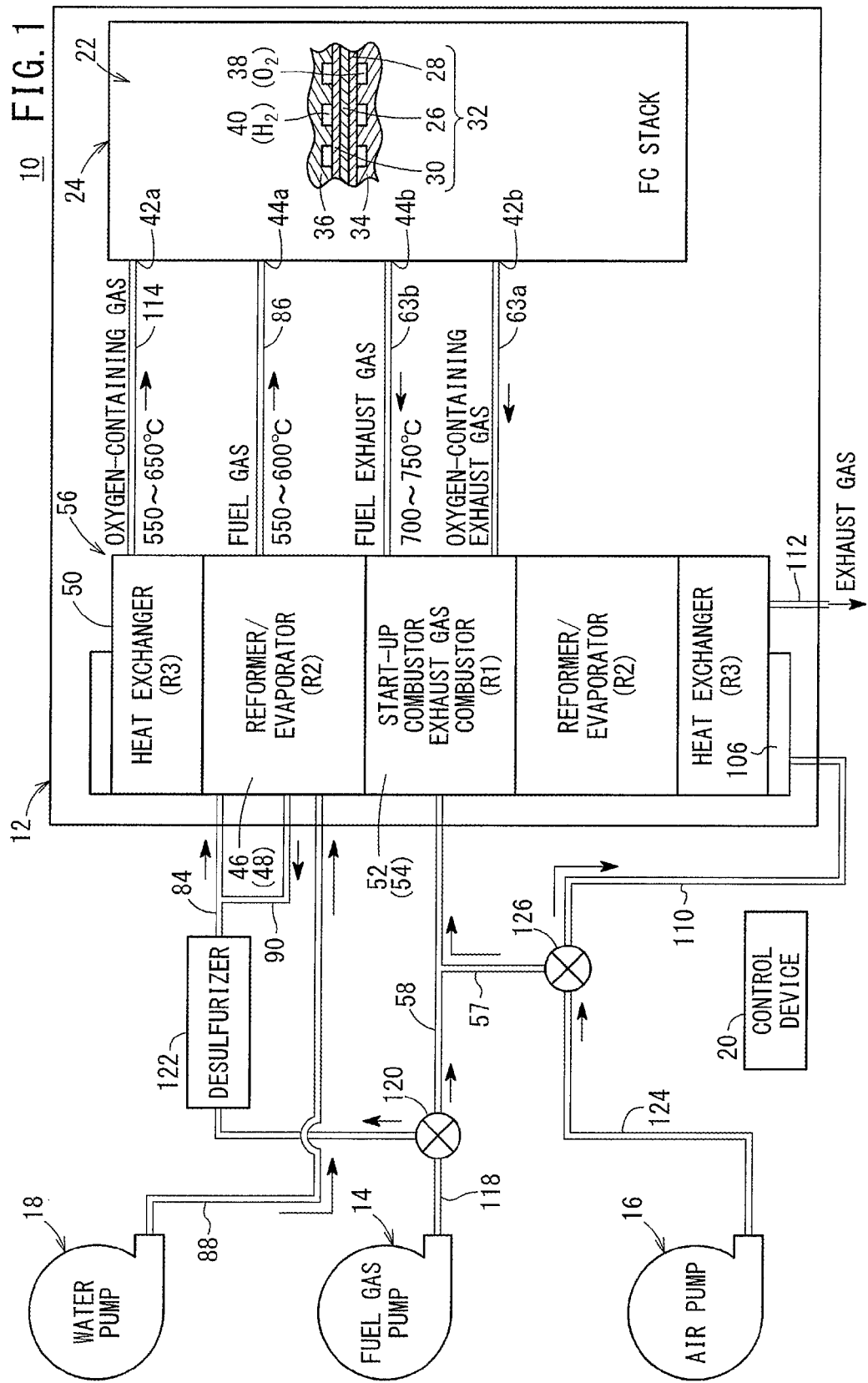
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a solid oxide fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, that is, several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of water vapor and a raw fuel chiefly containing hydrocarbon (e.g., city gas) to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Figure 2:
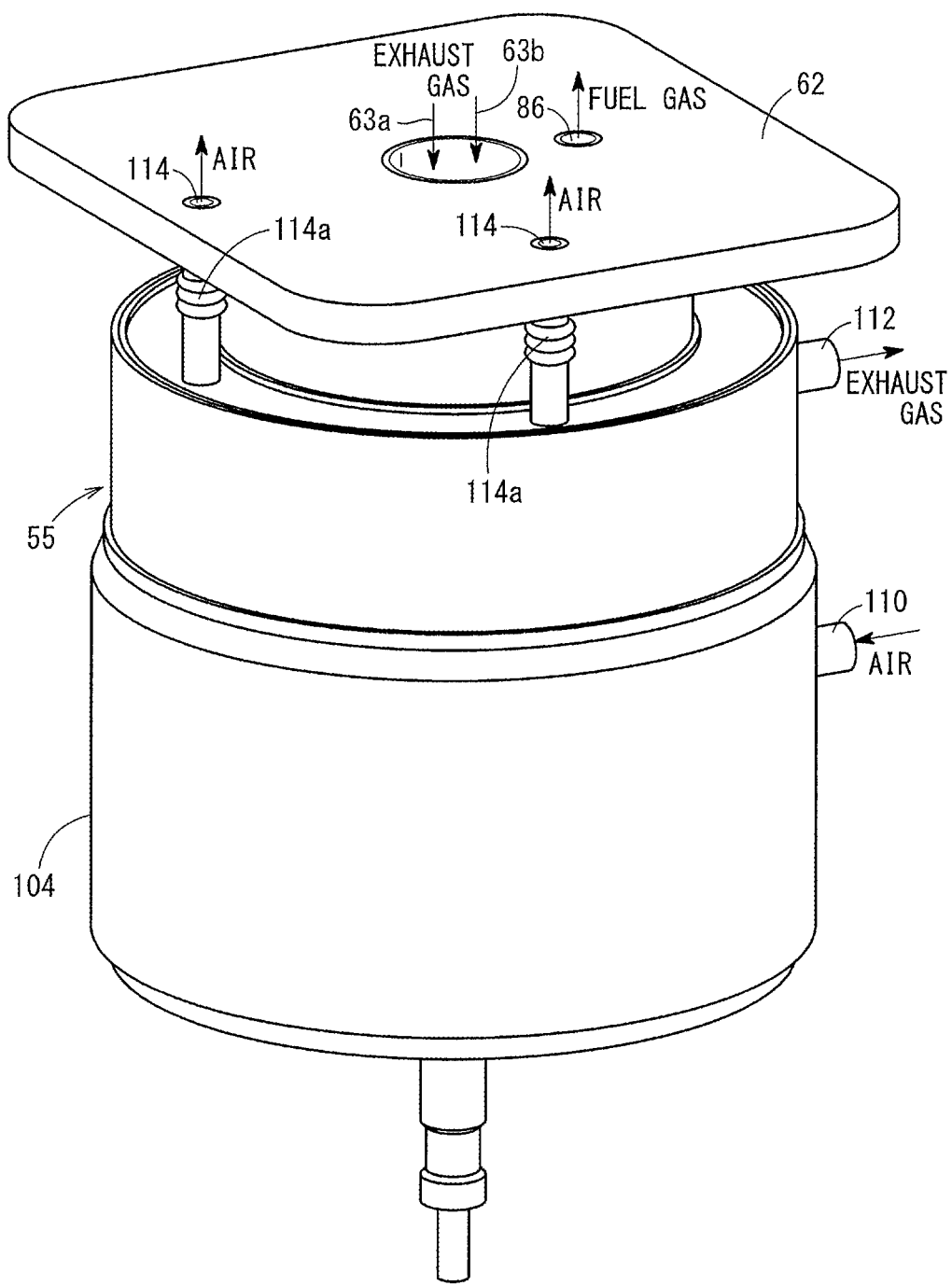
FIG. 2 is a perspective view showing FC peripheral equipment of the fuel cell module.

Basically, the fuel cell module 12 is made up of the fuel cell stack 24 and FC (fuel cell) peripheral equipment (BOP) 56 (see FIGS. 1 and 2). The FC peripheral equipment 56 includes the reformer 46, the evaporator 48, the heat exchanger 50, the exhaust gas combustor 52, and the start-up combustor 54.

Figure 3:
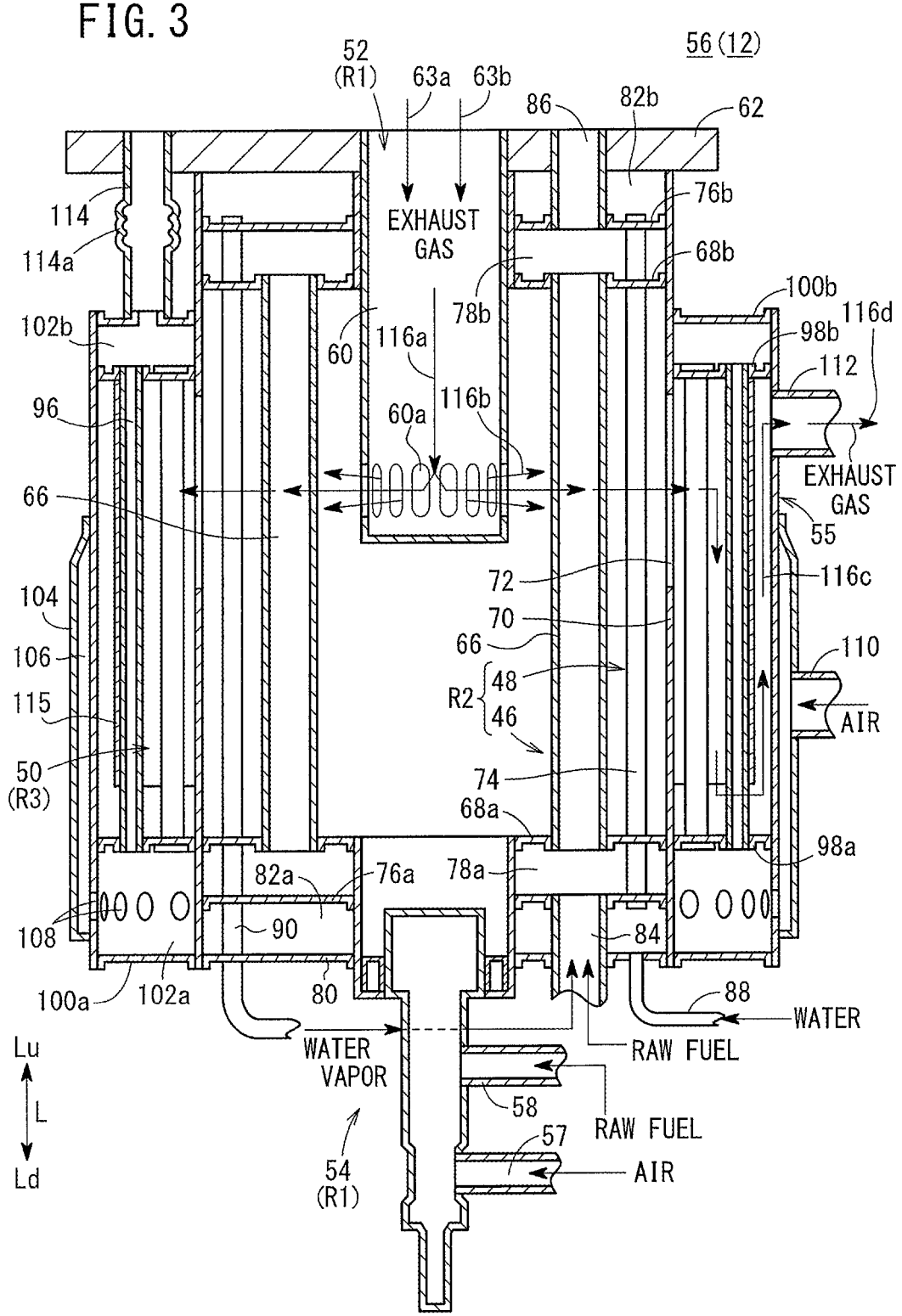
FIG. 3 is a cross sectional view showing the FC peripheral equipment.
Figure 4:
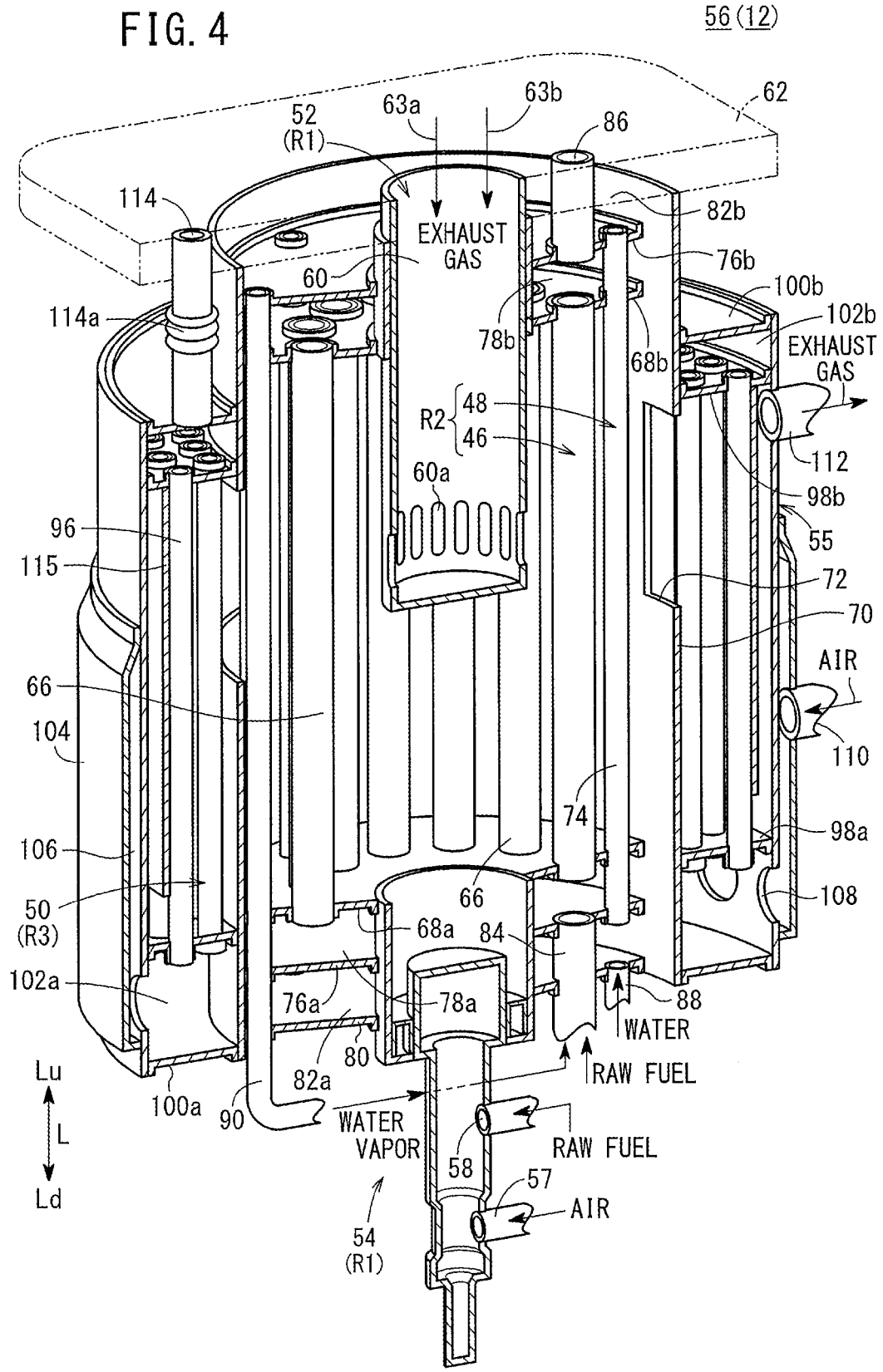
FIG. 4 is a perspective view with partial omission showing the FC peripheral equipment.
Figure 5:
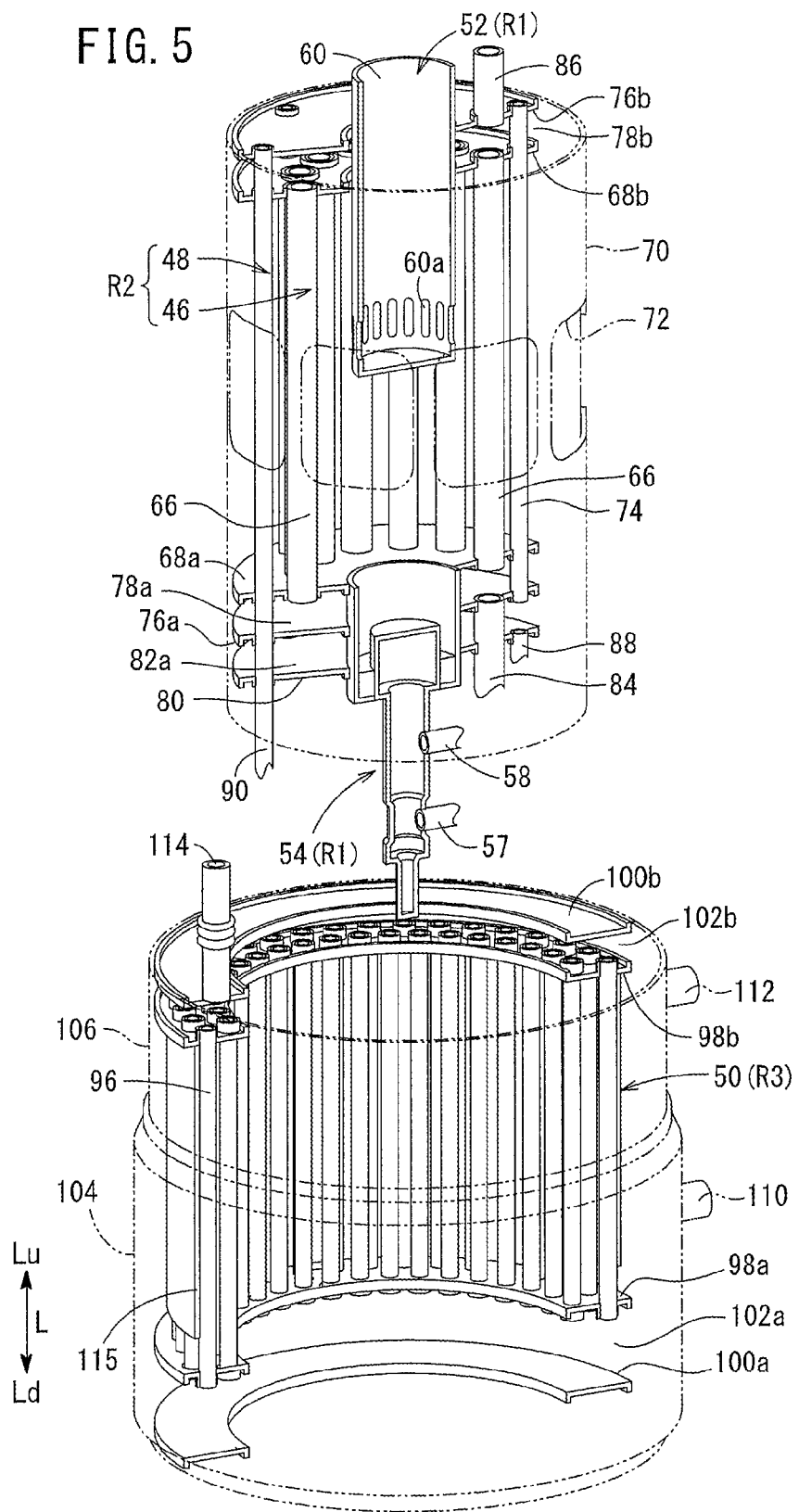
FIG. 5 is an exploded perspective view showing main components of the FC peripheral equipment.

As shown in FIGS. 3 to 5, the FC peripheral equipment 56 includes a first area R1 where the exhaust gas combustor 52 and the start-up combustor 54 are provided, an annular second area R2 formed around the first area R1 and where the reformer 46 and the evaporator 48 are provided, an annular third area R3 formed around the second area R2 and where the heat exchanger 50 is provided. A cylindrical outer member 55 constituting an outer wall is provided on the outer peripheral side of the third area R3.

The start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57 for sucking the raw fuel.

The exhaust gas combustor 52 is spaced away from the start-up combustor 54, and includes a combustion cup 60 formed in a shape of a cylinder having a bottom. A plurality of holes (e.g., circular holes or rectangular holes) 60a are formed along the outer circumference of the marginal end of the combustion cup 60 on the bottom side. A stack attachment plate 62 is engaged with the other end of the combustion cup 60 on the opening side. The fuel cell stack 24 is attached to the stack attachment plate 62.

One end of an oxygen-containing exhaust gas channel 63a and one end of a fuel exhaust gas channel 63b are provided at the combustion cup 60. The combustion gas is produced inside the combustion cup 60 by combustion reaction of the fuel gas (more specifically, fuel exhaust gas) and the oxygen-containing gas (more specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 3 to 5, the reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is set at several hundred ° C.

The reformer 46 includes a plurality of reforming pipes (heat transmission pipes) 66 provided around the exhaust gas combustor 52 and the start-up combustor 54. Each of the reforming pipes 66 is filled with reforming catalyst pellets (not shown). Each of the reforming pipes 66 has one end (lower end) fixed to a first lower ring member 68a, and the other end (upper end) fixed to a first upper ring member 68b.

The outer circumferential portions of the first lower ring member 68a and the first upper ring member 68b are fixed to the inner circumferential portion of a cylindrical member 70 by welding or the like. The inner circumferential portions of the first lower ring member 68a and the first upper ring member 68b are fixed to the outer circumferential portions of the exhaust gas combustor 52 and the start-up combustor 54 by welding or the like. The cylindrical member 70 extends in an axial direction indicated by an arrow L, and an end of the cylindrical member 70 adjacent to the fuel cell stack 24 is fixed to the stack attachment plate 62. A plurality of openings 72 are formed in the outer circumference of the cylindrical member 70 in a circumferential direction at predetermined height positions.

Figure 6:
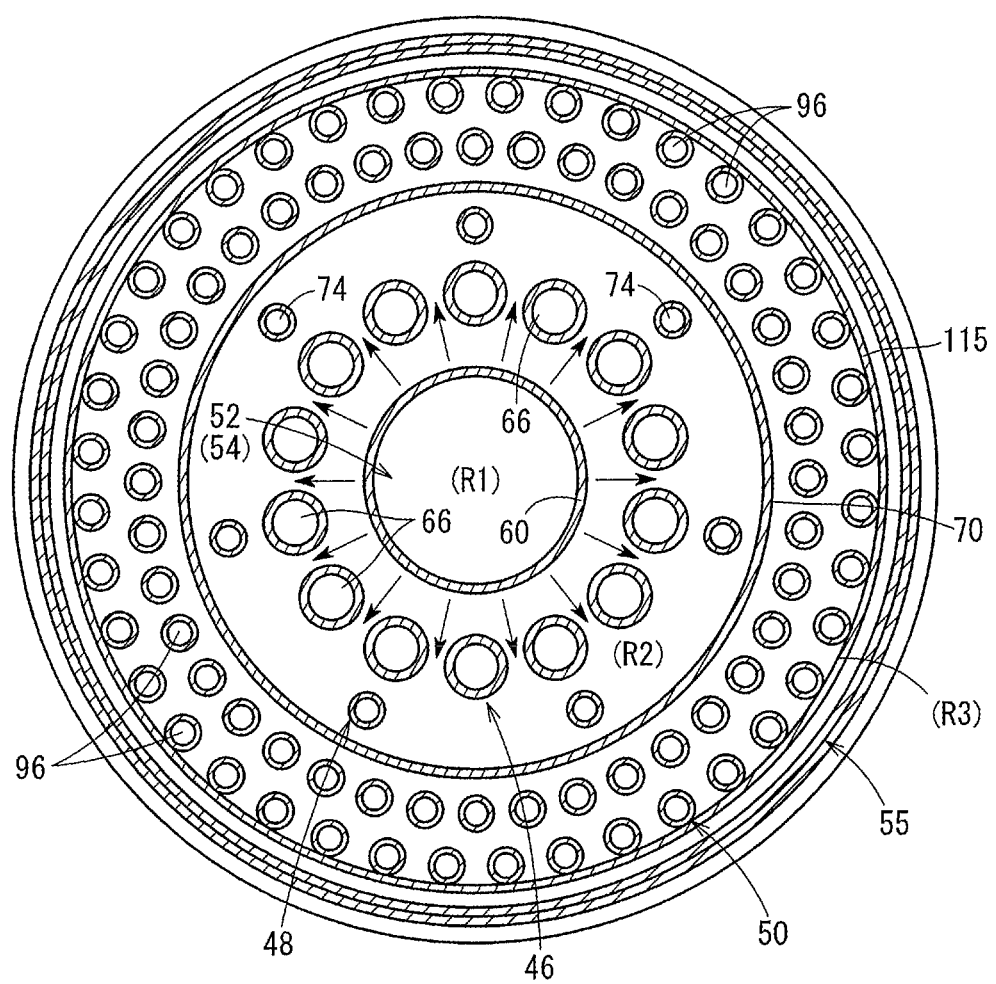
FIG. 6 is a cross sectional plan view showing the FC peripheral equipment.

The evaporator 48 has evaporation pipes (heat transmission pipes) 74 provided adjacent to, and outside the reforming pipes 66 of the reformer 46. As shown in FIG. 6, the reforming pipes 66 are arranged at equal intervals on a virtual circle, concentrically around the first area R1. The evaporation pipes 74 are arranged at equal intervals on a virtual circle, concentrically around the first area R1. The number of the evaporation pipes 74 is half of the number of the reforming pipes 66. The evaporation pipes 74 are positioned on the back side of every other position of the reforming pipe 66 (i.e., at positions spaced away from the center of the first area R1).

As shown in FIGS. 3 and 4, each of the evaporation pipes 74 has one end (lower end) which is fixed to a second lower ring member 76a by welding or the like, and the other end (upper end) which is fixed to a second upper ring member 76b by welding or the like. The outer circumferential portions of the second lower ring member 76a and the second upper ring member 76b are fixed to the inner circumferential portion of the cylindrical member 70 by welding or the like. The inner circumferential portions of the second lower ring member 76a and the second upper ring member 76b are fixed to the outer circumferential portions of the exhaust gas combustor 52 and the start-up combustor 54 by welding or the like.

The second lower ring member 76a is positioned below the first lower ring member 68a (i.e., outside the first lower ring member 68a in the axial direction), and the second upper ring member 76b is positioned above the first upper ring member 68b (i.e., outside the first upper ring member 68b in the axial direction).

An annular mixed gas supply chamber 78a is formed between the first lower ring member 68a and the second lower ring member 76a, and a mixed gas of raw fuel and water vapor is supplied to the mixed gas supply chamber 78a. Further, an annular fuel gas discharge chamber 78b is formed between the first upper ring member 68b and the second upper ring member 76b, and the produced fuel gas (reformed gas) is discharged to the fuel gas discharge chamber 78b. Both ends of each of the reforming pipes 66 are opened to the mixed gas supply chamber 78a and the fuel gas discharge chamber 78b.

A ring shaped end ring member 80 is fixed to an end of the cylindrical member 70 on the start-up combustor 54 side by welding or the like. An annular water supply chamber 82a is formed between the end ring member 80 and the second lower ring member 76a, and water is supplied to the water supply chamber 82a. An annular water vapor discharge chamber 82b is formed between the second upper ring member 76b and the stack attachment plate 62, and water vapor is discharged to the water vapor discharge chamber 82b. Both ends of each of the evaporation pipes 74 are opened to the water supply chamber 82a and the water vapor discharge chamber 82b.

The fuel gas discharge chamber 78b and the water vapor discharge chamber 82b are provided in a double deck manner, and the fuel gas discharge chamber 78b is provided on the inner side with respect to the water vapor discharge chamber 82b (i.e., below the water vapor discharge chamber 82b). The mixed gas supply chamber 78a and the water supply chamber 82a are provided in a double deck manner, and the mixed gas supply chamber 78a is provided on the inner side with respect to the water supply chamber 82a (i.e., above the water supply chamber 82a).

A raw fuel supply channel 84 is opened to the mixed gas supply chamber 78a, and an evaporation return pipe 90 described later is connected to a position in the middle of the raw fuel supply channel 84 (see FIG. 1). The raw fuel supply channel 84 has an ejector function, and generates negative pressure by the flow of the raw fuel for sucking the water vapor.

The raw fuel supply channel 84 is fixed to the second lower ring member 76a and the end ring member 80 by welding or the like. One end of a fuel gas channel 86 is connected to the fuel gas discharge chamber 78b, and the other end of the fuel gas channel 86 is connected to the fuel gas supply passage 44a of the fuel cell stack 24 (see FIG. 1). The fuel gas channel 86 is fixed to the second upper ring member 76b by welding or the like, and extends through the stack attachment plate 62 (see FIG. 2).

A water channel 88 is connected to the water supply chamber 82a. The water channel 88 is fixed to the end ring member 80 by welding or the like. One end of the evaporation return pipe 90 formed by at least one evaporation pipe 74 is provided in the water vapor discharge chamber 82b, and the other end of the evaporation return pipe 90 is connected to a position in the middle of the raw fuel supply channel 84 (see FIG. 1).

Figure 7:
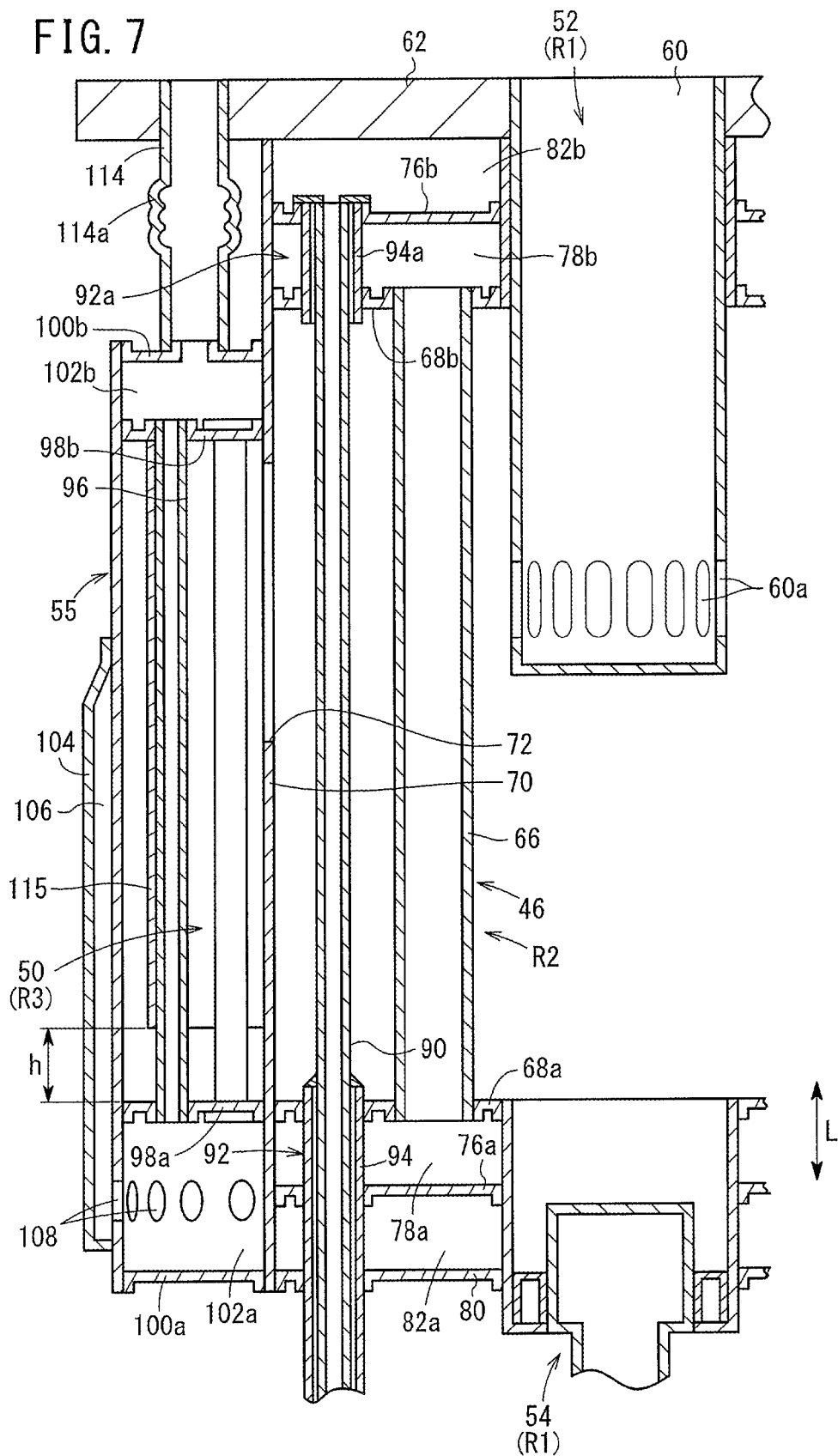
FIG. 7 is a view showing an evaporation return pipe of the FC peripheral equipment.

As shown in FIG. 7, the evaporation return pipe 90 has dual pipe structure 92 in a portion thereof passing through the mixed gas supply chamber 78a and the water supply chamber 82a. The dual pipe structure 92 includes an outer pipe 94. The outer pipe 94 surrounds the evaporation return pipe 90, and the outer pipe 94 is positioned coaxially with the evaporation return pipe 90. The outer pipe 94 is fixed to the first lower ring member 68a, the second lower ring member 76a, and the end ring member 80 by welding or the like, and extends in the direction indicated by an arrow L. A gap is provided between the outer circumference of the evaporation return pipe 90 and the inner circumference of the outer pipe 94. This gap may not be provided.

The evaporation return pipe 90 may have dual pipe structure 92a in a portion thereof passing through the fuel gas discharge chamber 78b. The dual pipe structure 92a includes an outer pipe 94a. The outer pipe 94a surrounds the evaporation return pipe 90, and the outer pipe 94a is positioned coaxially with the evaporation return pipe 90. The outer pipe 94a is fixed to the first upper ring member 68b and the second upper ring member 76b by welding or the like, and extends in the direction indicated by the arrow L. A gap is formed between the outer circumference of the evaporation return pipe 90 and the inner circumference of the outer pipe 94a as necessary. The lower end of the outer pipe 94a is not welded to the first upper ring member 68b.

As shown in FIGS. 3 and 4, the heat exchanger 50 includes a plurality of heat exchange pipes (heat transmission pipes) 96 which are provided along and around the outer circumference of the cylindrical member 70. As shown in FIG. 6, a plurality of the heat exchange pipes 96 are arranged on each of two virtual circles positioned concentrically around the center of the first area R1. Each of the heat exchange pipes 96 has one end (lower end) fixed to a lower ring member 98a, and the other end (upper end) fixed to an upper ring member 98b.

A lower end ring member 100a is provided below the lower ring member 98a, and an upper end ring member 100b is provided above the upper ring member 98b. The lower end ring member 100a and the upper end ring member 100b are fixed to the outer circumference of the cylindrical member 70 and the inner circumference of the outer member 55 by welding or the like.

An annular oxygen-containing gas supply chamber 102a to which the oxygen-containing gas is supplied is formed between the lower ring member 98a and the lower end ring member 100a. An annular oxygen-containing gas discharge chamber 102b is formed between the upper ring member 98b and the upper end ring member 100b. The heated oxygen-containing gas is discharged to the oxygen-containing gas discharge chamber 102b. Both ends of each of the heat exchange pipes 96 are fixed to the lower ring member 98a and the upper ring member 98b by welding or the like, and opened to the oxygen-containing gas supply chamber 102a and the oxygen-containing gas discharge chamber 102b.

The mixed gas supply chamber 78a and the water supply chamber 82a are placed on the radially inward side relative to the inner circumference of the oxygen-containing gas supply chamber 102a. The oxygen-containing gas discharge chamber 102b is provided outside the fuel gas discharge chamber 78b at a position offset downward from the fuel gas discharge chamber 78b.

A cylindrical cover member 104 is provided on the outer circumferential portion of the outer member 55. The center position of the cylindrical cover member 104 is shifted downward. Both of upper and lower ends (both of axial ends) of the cover member 104 are fixed to the outer member 55 by welding or the like, and a heat recovery area (chamber) 106 is formed between the cover member 104 and the outer circumferential portion of the outer member 55.

A plurality of holes 108 are formed circumferentially in a lower marginal end portion of the outer member 55 of the oxygen-containing gas supply chamber 102a, and the oxygen-containing gas supply chamber 102a communicates with the heat recovery area 106 through the holes 108. An oxygen-containing gas supply pipe 110 communicating with the heat recovery area 106 is connected to the cover member 104. An exhaust gas pipe 112 communicating with the third area R3 is connected to an upper portion of the outer member 55.

For example, one end of each of two oxygen-containing gas pipes 114 is provided in the oxygen-containing gas discharge chamber 102b. Each of the oxygen-containing gas pipes 114 has a stretchable member such as a bellows 114a between the upper end ring member 100b and the stack attachment plate 62. The other end of each of the oxygen-containing gas pipes 114 extends through the stack attachment plate 62, and is connected to the oxygen-containing gas supply passage 42a of the fuel cell stack 24 (see FIG. 1).

In the first embodiment, as shown in FIGS. 3 to 6, a circumscribed non-uniform flow suppression plate 115 is provided in the third area R3 where the heat exchanger 50 is provided. The circumscribed non-uniform flow suppression plate 115 has a cylindrical shape. As shown in FIG. 6, the circumscribed non-uniform flow suppression plate 115 is provided along the minimum circumscribed circle which is tangent to the outer surfaces of the plurality of heat exchange pipes 96 arranged along the outer virtual circle. For example, the circumscribed non-uniform flow suppression plate 115 is fixed to the heat exchange pipes 96 by welding or the like.

As shown in FIGS. 3 and 7, the circumscribed non-uniform flow suppression plate 115 is made of a thin metal plate, and positioned on a side closer to the exhaust gas combustor 52 in the pipe length direction, indicated by an arrow L, of the heat exchange pipes 96. Specifically, the upper end of the circumscribed non-uniform flow suppression plate 115 is fixed to the upper ring member 98b, and the lower end of the circumscribed non-uniform flow suppression plate 115 is spaced upward from the lower ring member 98a by a predetermined distance h. The circumscribed non-uniform flow suppression plate 115 may be provided as closely as possible to the heat exchange pipes 96.

As shown in FIG. 3, a first combustion gas channel 116a as a passage of the combustion gas is formed in the first area R1, and a second combustion gas channel 116b as a passage of the combustion gas that has passed through the holes 60a is formed in the second area R2. A third combustion gas channel 116c as a passage of the combustion gas that has passed through the openings 72 is formed in the third area R3. Further, a fourth combustion gas channel 116d is formed as a passage of the combustion gas after the exhaust gas pipe 112.

The second combustion gas channel 116b forms the reformer 46 and the evaporator 48, and the third combustion gas channel 116c forms the heat exchanger 50. The third combustion gas channel 116c has a bent shape, in which gas first flows downward in a direction indicated by an arrow Ld by the circumscribed non-uniform flow suppression plate 115, next flows between the lower end of the circumscribed non-uniform flow suppression plate 115 and the lower ring member 98a, and then turns up and flows upward in a direction indicated by an arrow Lu.

As shown in FIG. 1, the raw fuel supply apparatus 14 includes a raw fuel channel 118. The raw fuel channel 118 is branched into the raw fuel supply channel 84 and the raw fuel supply pipe 58 through a raw fuel regulator valve 120. A desulfurizer 122 for removing sulfur compounds in the city gas (raw fuel) is provided in the raw fuel supply channel 84.

The oxygen-containing gas supply apparatus 16 includes an oxygen-containing gas channel 124. The oxygen-containing gas channel 124 is branched into the oxygen-containing gas supply pipe 110 and the air supply pipe 57 through an oxygen-containing gas regulator valve 126. The water supply apparatus 18 is connected to the evaporator 48 through the water channel 88.

Operation of the fuel cell system 10 will be described below.

At the time of starting operation of the fuel cell system 10, the air (oxygen-containing gas) and the raw fuel are supplied to the start-up combustor 54. More specifically, by operation of the air pump, the air is supplied to the oxygen-containing gas channel 124. By adjusting the opening degree of the oxygen-containing gas regulator valve 126, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 118. By regulating the opening degree of the raw fuel regulator valve 120, the raw fuel is supplied into the raw fuel supply pipe 58. The raw fuel is mixed with the air, and supplied into the start-up combustor 54 (see FIGS. 3 and 4).

Thus, the mixed gas of the raw fuel and the air is supplied into the start-up combustor 54, and the mixed gas is ignited to start combustion. Therefore, the combustion gas produced in combustion flows from the first area R1 to the second area R2.

Further, the combustion gas is supplied to the third area R3, and then, the combustion gas is discharged to the outside of the fuel cell module 12 through the exhaust gas pipe 112.

As shown in FIGS. 3 and 4, the reformer 46 and the evaporator 48 are provided in the second area R2, and the heat exchanger 50 is provided in the third area R3. Thus, the combustion gas discharged from the first area R1 first heats the reformer 46, next heats the evaporator 48, and then heats the heat exchanger 50.

Then, after the temperature of the fuel cell module 12 is raised to a predetermined temperature, the air (oxygen-containing gas) is supplied to the heat exchanger 50, and the mixed gas of the raw fuel and the water vapor is supplied to the reformer 46.

More specifically, as shown in FIG. 1, the opening degree of the oxygen-containing gas regulator valve 126 is adjusted such that the flow rate of the air supplied to the oxygen-containing gas supply pipe 110 is increased, and the opening degree of the raw fuel regulator valve 120 is adjusted such that the flow rate of the raw fuel supplied to the raw fuel supply channel 84 is increased. Further, by operation of the water supply apparatus 18, the water is supplied to the water channel 88. The air is supplied from the oxygen-containing gas supply pipe 110 to the heat recovery area 106 of the outer member 55. Thus, the air flows through the holes 108 into the oxygen-containing gas supply chamber 102a.

Therefore, as shown in FIGS. 3 and 4, the air flows into the heat exchanger 50, and after the air is temporarily supplied to the oxygen-containing gas supply chamber 102a, while the air is moving inside the heat exchange pipes 96, the air is heated by heat exchange with the combustion gas supplied into the third area R3. After the heated air is temporarily supplied to the oxygen-containing gas discharge chamber 102b, the air is supplied to the oxygen-containing gas supply passage 42a of the fuel cell stack 24 through the oxygen-containing gas pipes 114 (see FIG. 1). In the fuel cell stack 24, the heated air flows along the oxygen-containing gas flow field 38, and the air is supplied to the cathode 28.

After the air flows through the oxygen-containing gas flow field 38, the air is discharged from the oxygen-containing gas discharge passage 42b into the oxygen-containing exhaust gas channel 63a. The oxygen-containing exhaust gas channel 63a is opened to the combustion cup 60 of the exhaust gas combustor 52, and the oxygen-containing exhaust gas is supplied into the combustion cup 60.

Further, as shown in FIG. 1, the water from the water supply apparatus 18 is supplied to the evaporator 48. After the raw fuel is desulfurized in the desulfurizer 122, the raw fuel flows through the raw fuel supply channel 84, and moves toward the reformer 46.

In the evaporator 48, after the water is temporarily supplied to the water supply chamber 82a, while water is moving inside the evaporation pipes 74, the water is heated by the combustion gas flowing through the second area R2, and vaporized. After the water vapor flows into the water vapor discharge chamber 82b, the water vapor is supplied to the evaporation return pipe 90 connected to the water vapor discharge chamber 82b. Thus, the water vapor flows inside the evaporation return pipe 90, and flows into the raw fuel supply channel 84. Then, the water vapor is mixed with the raw fuel supplied by the raw fuel supply apparatus 14 to produce the mixed gas.

The mixed gas from the raw fuel supply channel 84 is temporarily supplied to the mixed gas supply chamber 78a of the reformer 46. The mixed gas moves inside the reforming pipes 66. In the meanwhile, the mixed gas is heated by the combustion gas flowing through the second area R2, and is then steam-reformed. After removal (reforming) of hydrocarbon of $C_{2+}$, a reformed gas chiefly containing methane is obtained.

After this reformed gas is heated, the reformed gas is temporarily supplied to the fuel gas discharge chamber 78b as the fuel gas. Thereafter, the fuel gas is supplied to the fuel gas supply passage 44a of the fuel cell stack 24 through the fuel gas channel 86 (see FIG. 1). In the fuel cell stack 24, the heated fuel gas flows along the fuel gas flow field 40, and the fuel gas is supplied to the anode 30. In the meanwhile, the air is supplied to the cathode 28. Thus, electricity is generated in the electrolyte electrode assembly 32.

After the fuel gas flows through the fuel gas flow field 40, the fuel gas is discharged from the fuel gas discharge passage 44b to the fuel exhaust gas channel 63b. The fuel exhaust gas channel 63b is opened to the inside of the combustion cup 60 of the exhaust gas combustor 52, and the fuel exhaust gas is supplied into the combustion cup 60.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the combustion cup 60. In the meanwhile, combustion operation by the start-up combustor 54 is stopped.

The combustion cup 60 has the holes 60a. Therefore, as shown in FIG. 3, the combustion gas supplied into the combustion cup 60 flows through the holes 60a from the first area R1 into the second area R2. Then, after the combustion gas is supplied to the third area R3, the combustion gas is discharged to the outside of the fuel cell module 12.

In the first embodiment, the FC peripheral equipment 56 includes the first area R1 where the exhaust gas combustor 52 and the start-up combustor 54 are provided, the annular second area R2 around the first area R1 and where the reformer 46 and the evaporator 48 are provided, and the annular third area R3 around the second area R2 and where the heat exchanger 50 is provided.

That is, the first area R1 is provided at the center, the annular second area R2 is provided around the first area R1, and the annular third area R3 is provided around the second area R2. Heat waste and heat radiation can be suppressed suitably. Thus, improvement in the heat efficiency is achieved, thermally self-sustaining operation is facilitated, and the entire fuel cell module 12 can be made simple and compact. The thermally self-sustaining operation herein means operation where the operating temperature of the fuel cell 22 is maintained using only heat energy generated in the fuel cell 22 itself, without supplying additional heat from the outside.

The heat exchanger 50 includes the annular oxygen-containing gas supply chamber 102a, the annular oxygen-containing gas discharge chamber 102b, the heat exchange pipes 96, and the third combustion gas channel 116c. The oxygen-containing gas is supplied to the oxygen-containing gas supply chamber 102a, and the heated oxygen-containing gas is discharged into the oxygen-containing gas discharge chamber 102b. Each of the heat exchange pipes 96 has one end connected to the oxygen-containing gas supply chamber 102a, and the other end connected to the oxygen-containing gas discharge chamber 102b. The third combustion gas channel 116c supplies the combustion gas to the space between the heat exchange pipes 96.

Thus, simple structure is achieved easily. Accordingly, the production cost is reduced effectively. Further, by changing the volumes of the oxygen-containing gas supply chamber 102a and the oxygen-containing gas discharge chamber 102b, the length, the diameter, and the number of the pipes, a desired operation can be achieved depending on various operating conditions, and a wider variety of designs become available.

Further, in the first embodiment, the circumscribed non-uniform flow suppression plate 115 is provided along the minimum circumscribed circle which is tangent to the outer surfaces of the plurality of heat exchange pipes 96. In the structure, as shown in FIG. 3, the combustion gas which flows from the second area R2 to the third area R3 through the openings 72 is blown onto the circumscribed non-uniform flow suppression plate 115 facing the openings 72.

Thus, the combustion gas moves along the circumscribed non-uniform flow suppression plate 115 in the direction indicated by the arrow Ld, and the combustion gas is also blown onto each of the heat exchange pipes 96 which are tangent to the circumscribed non-uniform flow suppression plate 115 and each of the heat exchange pipes 96 which are arranged inside the circumscribed non-uniform flow suppression plate 115. After the combustion gas moves downward along one surface (inner surface) of the circumscribed non-uniform flow suppression plate 115 in the direction indicated by the arrow Ld, the combustion gas flows through the space formed at the lower end of the circumscribed non-uniform flow suppression plate 115, and turns up. Thereafter, the combustion gas flows along the other surface (outer surface) of the circumscribed non-uniform flow suppression plate 115 in the direction indicated by the arrow Lu.

In the structure, after the combustion gas flows into the third area R3, by the guidance of the circumscribed non-uniform flow suppression plate 115, the combustion gas flows along the outer surfaces of the heat exchange pipes 96 in the axial direction suitably. Thus, non-uniform flow and blow-through of the combustion gas are suppressed suitably, and the channel of the combustion gas can be sufficiently long. Accordingly, the quantity of the heat passed from the combustion gas to the oxygen-containing gas is increased, and improvement in the heat exchange efficiency is achieved suitably.

Further, as shown in FIG. 3, the reformer 46 includes the annular mixed gas supply chamber 78a, the annular fuel gas discharge chamber 78b, the reforming pipes 66, and the second combustion gas channel 116b. The mixed gas is supplied to the mixed gas supply chamber 78a, and the produced fuel gas is discharged into the fuel gas discharge chamber 78b. Each of the reforming pipes 66 has one end connected to the mixed gas supply chamber 78a, and the other end connected to the fuel gas discharge chamber 78b. The second combustion gas channel 116b supplies the combustion gas to the space between the reforming pipes 66.

Thus, the structure is simplified easily, and the production cost is reduced effectively. Further, by changing the volumes of the mixed gas supply chamber 78a and the fuel gas discharge chamber 78b, the length, the diameter, and the number of the pipes, a desired operation can be achieved depending on various operating conditions, and a wider variety of designs become available.

The evaporator 48 includes the annular water supply chamber 82a, the annular water vapor discharge chamber 82b, the evaporation pipes 74, and the second combustion gas channel 116b. The water is supplied to the water supply chamber 82a, and the water vapor is discharged into the water vapor discharge chamber 82b. Each of the evaporation pipes 74 has one end connected to the water supply chamber 82a, and the other end connected to the water vapor discharge chamber 82b. The second combustion gas channel 116b supplies the combustion gas to the space between the evaporation pipes 74.

Thus, the structure is simplified easily, and the production cost is reduced effectively. Further, by changing the volumes of the water supply chamber 82a and the water vapor discharge chamber 82b, the length, the diameter, and the number of the pipes, a desired operation can be achieved depending on various operating conditions, and a wider variety of designs become available.

Further, the fuel cell module 12 is a solid oxide fuel cell module. Therefore, the fuel cell module 12 is suitable for, in particular, high temperature type fuel cells such as SOFC.

Figure 8:
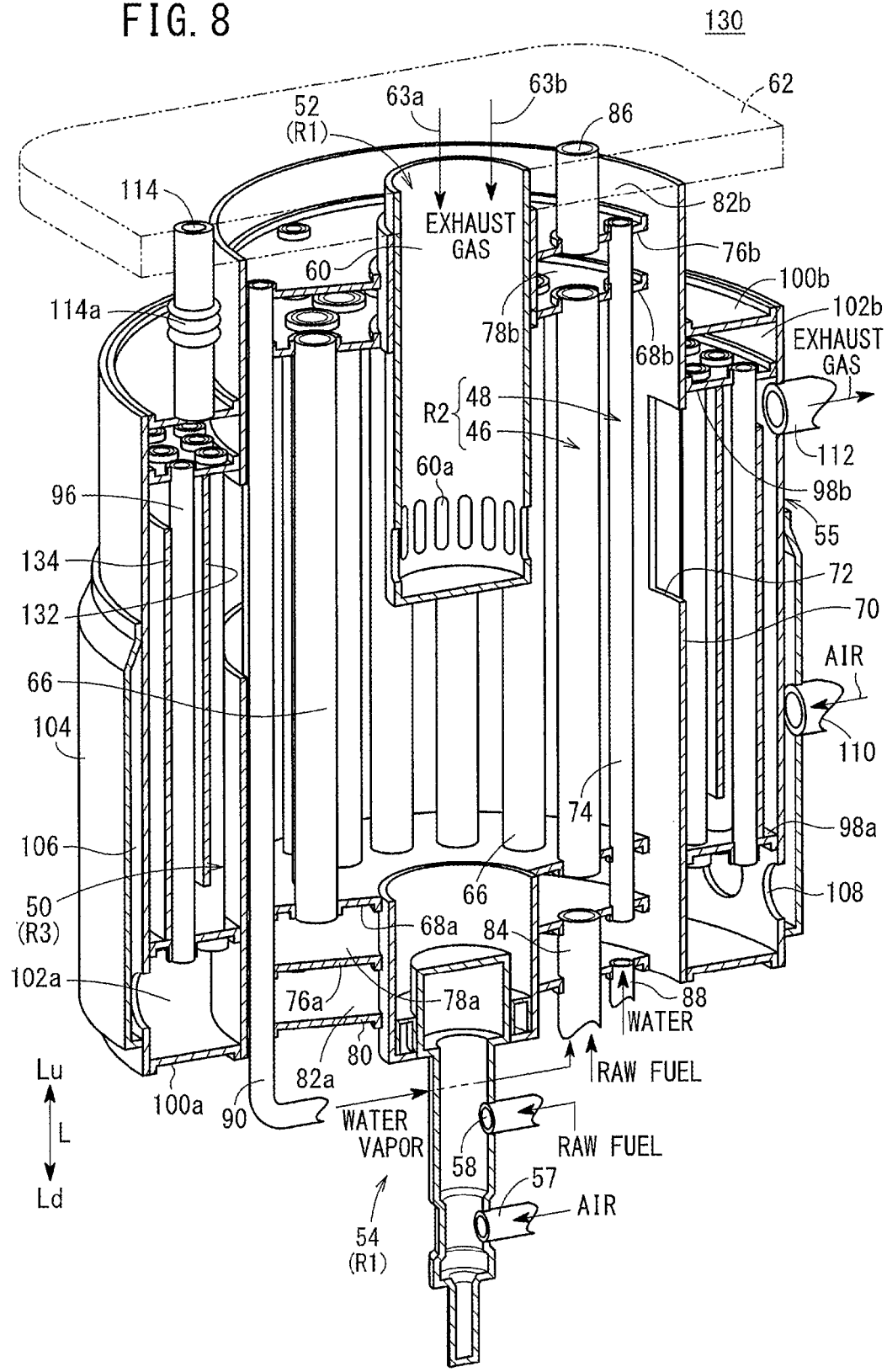
FIG. 8 is a perspective view with partial omission showing a fuel cell module according to a second embodiment of the present invention.
Figure 9:
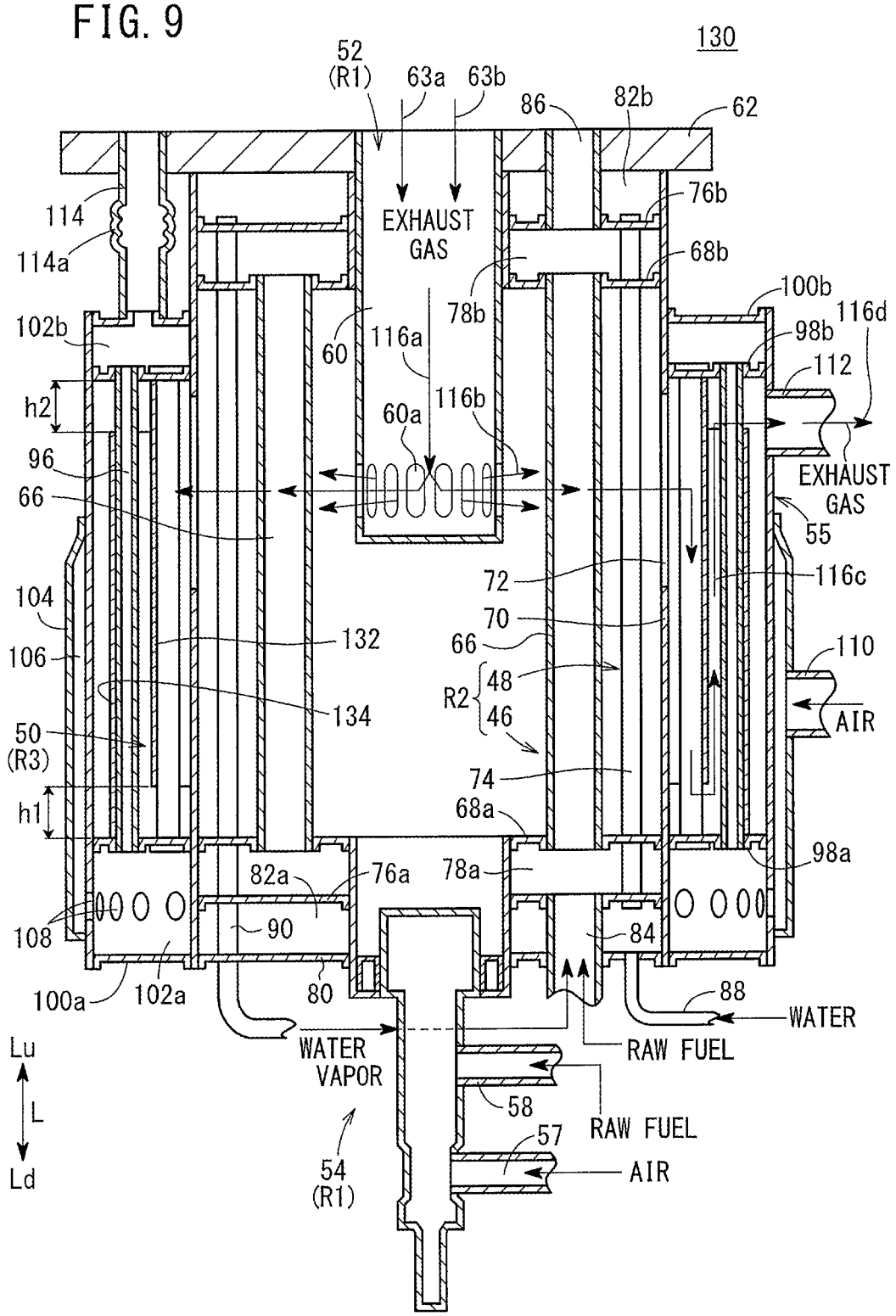
FIG. 9 is a cross sectional view showing the fuel cell module.
Figure 10:
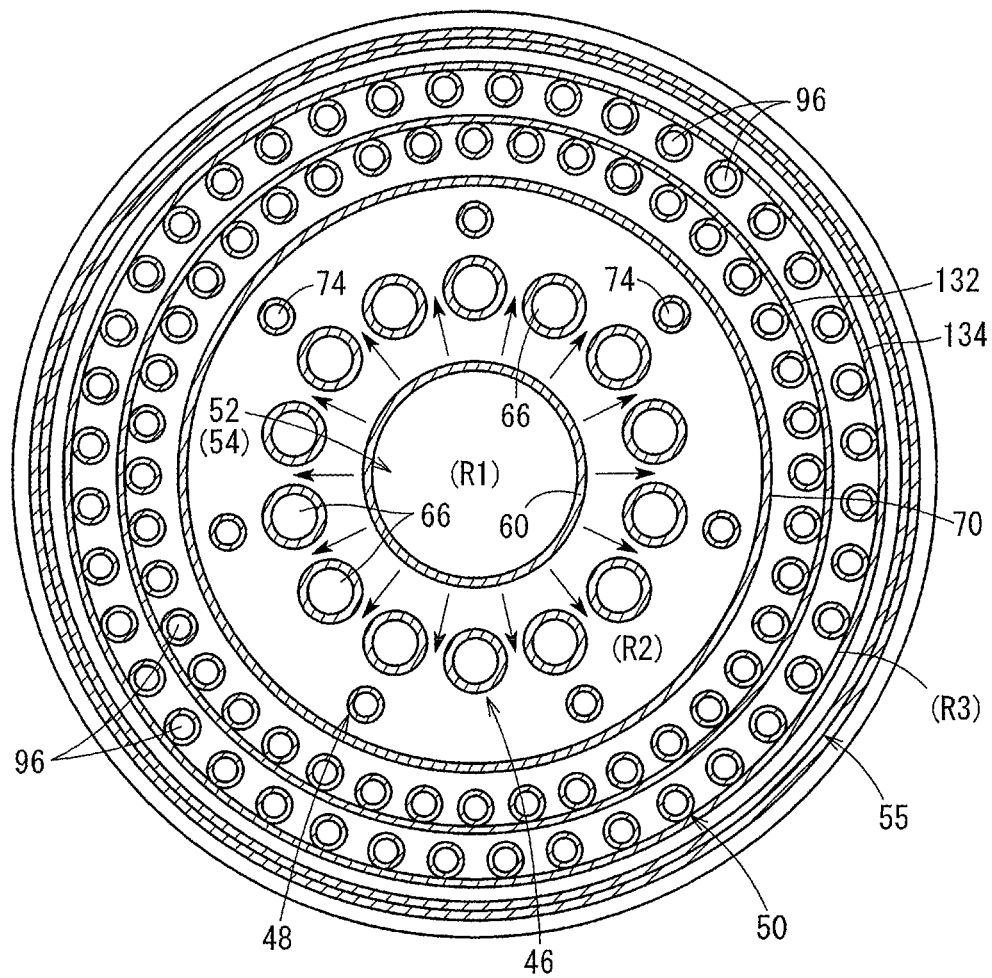
FIG. 10 is a cross sectional plan view showing the fuel cell module.

As shown in FIGS. 8, 9, and 10, a fuel cell module 130 according to a second embodiment of the present invention includes a first circumscribed non-uniform flow suppression plate 132 and a second circumscribed non-uniform flow suppression plate 134 provided in the third area R3 where the heat exchanger 50 is provided. The constituent elements of the fuel cell module 130 according to the second embodiment of the present invention that are identical to those of the fuel cell module 12 according to the first embodiment are labeled with the same reference numerals, and description thereof will be omitted. Further, also in third and other embodiments described later, the constituent elements that are identical to those of the fuel cell module 12 according to the first embodiment are labeled with the same reference numerals, and description thereof will be omitted.

As shown in FIG. 10, the first circumscribed non-uniform flow suppression plate 132 has a cylindrical shape provided along the minimum circumscribed circle which is tangent to the outer surfaces of the plurality of heat exchange pipes 96 on an inner virtual circle. The second circumscribed non-uniform flow suppression plate 134 has a cylindrical shape provided along the minimum circumscribed circle which is tangent to the outer surfaces of the plurality of heat exchange pipe 96 on an outer virtual circle. For example, the first circumscribed non-uniform flow suppression plate 132 and the second circumscribed non-uniform flow suppression plate 134 are fixed to the heat exchange pipes 96 by welding or the like.

As shown in FIGS. 8 and 9, for example, the first circumscribed non-uniform flow suppression plate 132 is made of a thin metal plate, and provided on a side closer to the exhaust gas combustor 52 in the pipe length direction of the heat exchange pipes 96 indicated by an arrow L. Specifically, the upper end of the first circumscribed non-uniform flow suppression plate 132 is fixed to the upper ring member 98b, and the lower end of the first circumscribed non-uniform flow suppression plate 132 is spaced upward from the lower ring member 98a by a predetermined distance h1 (see FIG. 9).

The second circumscribed non-uniform flow suppression plate 134 is made of a thin metal plate, and provided on a side away from the exhaust gas combustor 52 (i.e., a side closer to the start-up combustor 54) in the pipe length direction of the heat exchange pipes 96 indicated by the arrow L. Specifically, the lower end of the second circumscribed non-uniform flow suppression plate 134 is fixed to the lower ring member 98a, and the upper end of the second circumscribed non-uniform flow suppression plate 134 is spaced downward from the upper ring member 98b by a predetermined distance h2 (see FIG. 9).

The third combustion gas channel 116c has a bent shape, in which gas is first directed to flow downward in a direction indicated by an arrow Ld by the first circumscribed non-uniform flow suppression plate 132, and then directed to flow upward in a direction indicated by an arrow Lu by the second circumscribed non-uniform flow suppression plate 134.

In the second embodiment, as shown in FIG. 9, the combustion gas which flows from the second area R2 to the third area R3 through a plurality of openings 72 is blown onto the first circumscribed non-uniform flow suppression plate 132 facing the openings 72.

Therefore, the combustion gas moves along the first circumscribed non-uniform flow suppression plate 132 in the direction indicated by the arrow Ld, and the combustion gas is blown onto each of the heat exchange pipes 96 (inner heat exchange pipes 96) which are tangent to the first circumscribed non-uniform flow suppression plate 132. After the combustion gas flows along the inner surface of the first circumscribed non-uniform flow suppression plate 132 in the direction indicated by the arrow Ld, the combustion gas flows through a space formed at the lower end of the first circumscribed non-uniform flow suppression plate 132, and the combustion gas is blown onto the second circumscribed non-uniform flow suppression plate 134.

In this manner, the combustion gas flows along the inner surface of the second circumscribed non-uniform flow suppression plate 134 in the direction indicated by Lu, and the combustion gas is blown onto each of the heat exchange pipes 96 (outer heat exchange pipes 96) which are tangent to the second circumscribed non-uniform flow suppression plate 134.

In the structure, after the combustion gas flows into the third area R3, by the guidance of the first circumscribed non-uniform flow suppression plate 132 and the second circumscribed non-uniform flow suppression plate 134, the combustion gas flows along the outer surfaces of the heat exchange pipes 96 in the axial direction suitably. Thus, non-uniform flow and blow-through of the combustion gas are suppressed suitably, and the channel of the combustion gas can be sufficiently long. Accordingly, the same advantages as in the case of the first embodiment are obtained. For example, the quantity of the heat passed from the combustion gas to the oxygen-containing gas is increased, and improvement in the heat exchange efficiency is achieved suitably.

Further, among the first circumscribed non-uniform flow suppression plate 132 and the second circumscribed non-uniform flow suppression plate 134, the first circumscribed non-uniform flow suppression plate 132 provided at a position closest to the center of the first area R1 is positioned on a side closer to the exhaust gas combustor 52 in the pipe length direction. In the structure, the exhaust gas discharged from the exhaust gas combustor 52 can flow along the heat exchange pipes 96 still more smoothly and reliably by the guidance of the adjacent first circumscribed non-uniform flow suppression plate 132. Accordingly, the quantity of the heat passed from the combustion gas to the oxygen-containing gas (air) is increased, and improvement in the heat exchange efficiency is achieved suitably.

Figure 11:
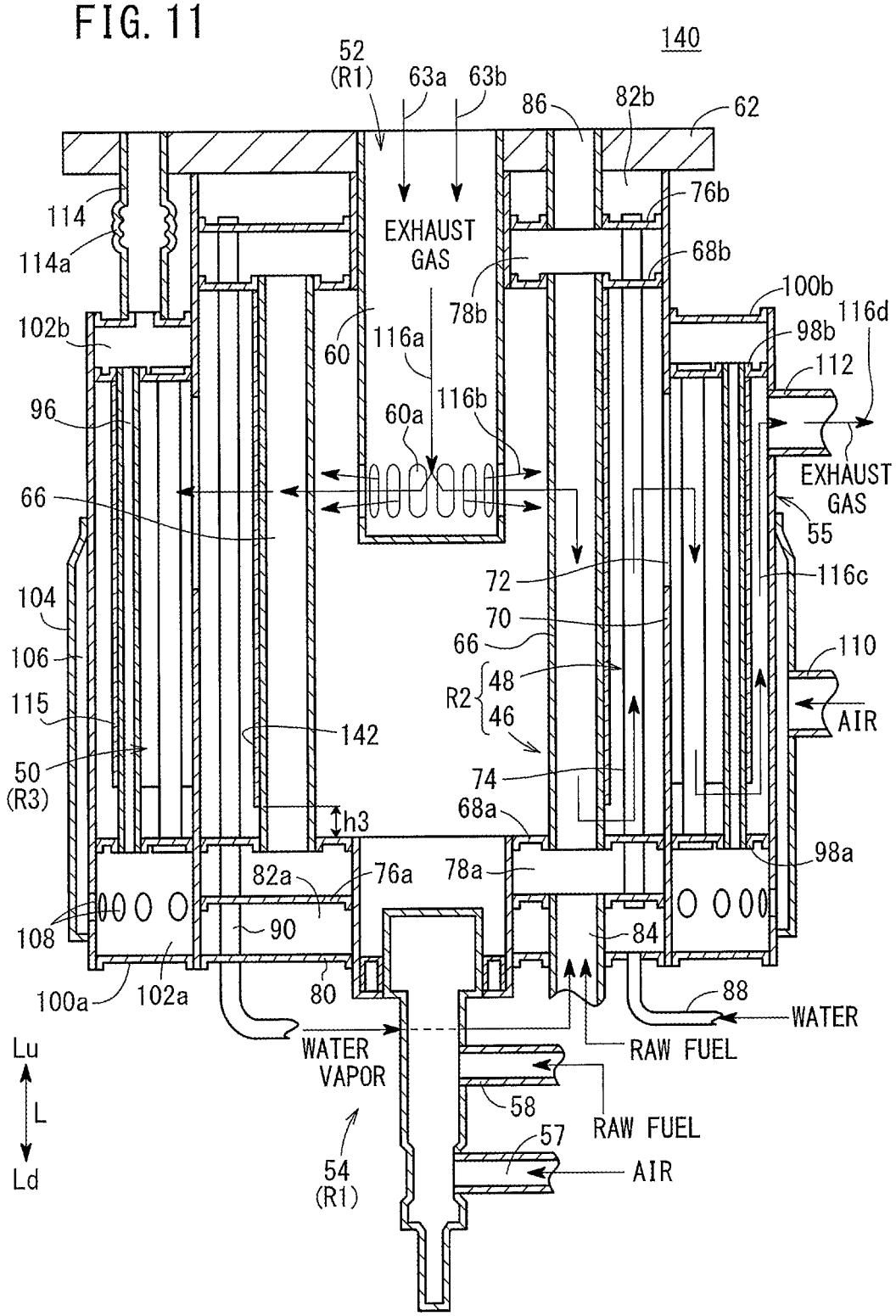
FIG. 11 is a cross sectional view showing a fuel cell module according to a third embodiment of the present invention.
Figure 12:
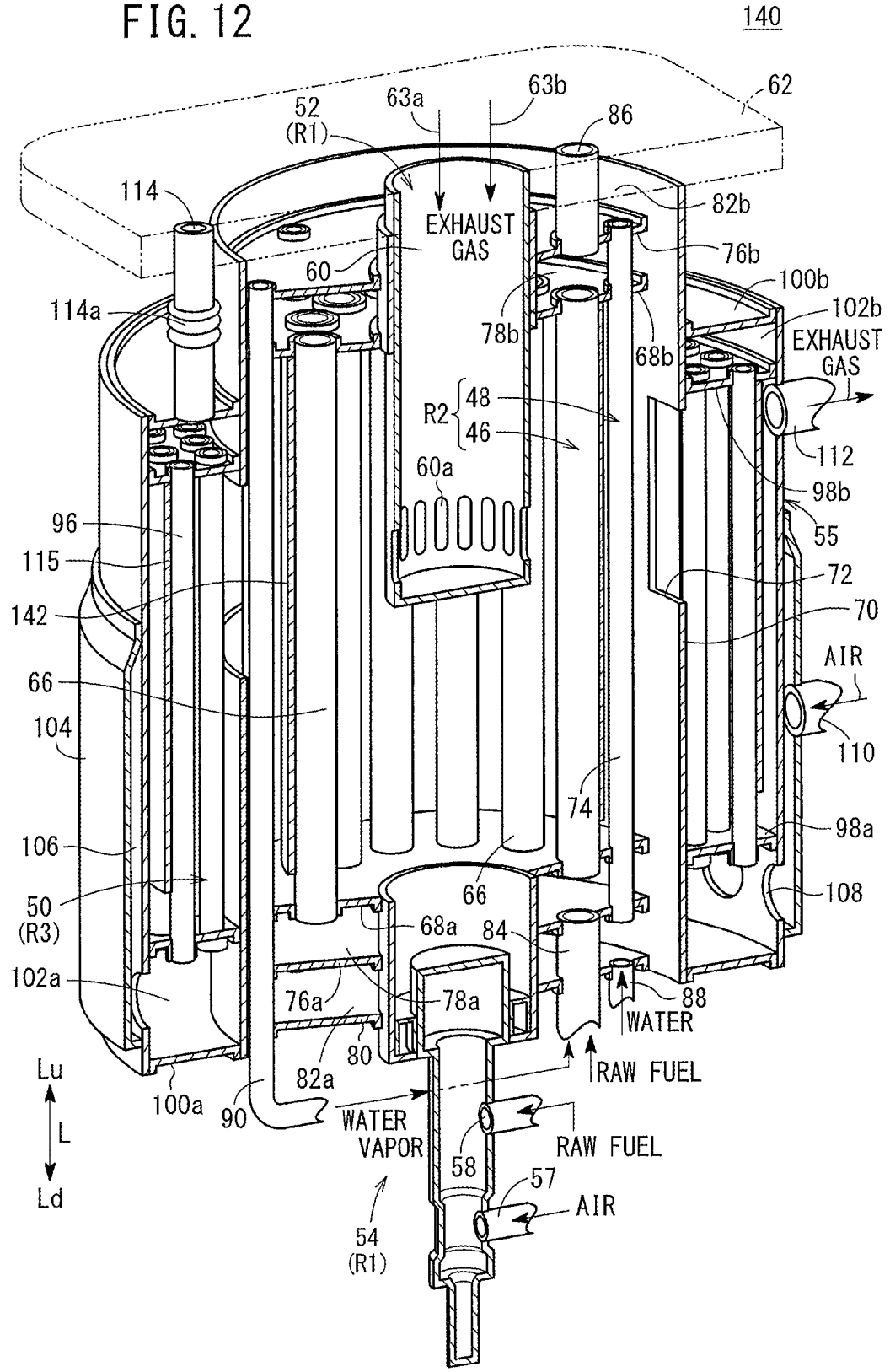
FIG. 12 is a perspective view with partial omission showing the fuel cell module.
Figure 13:
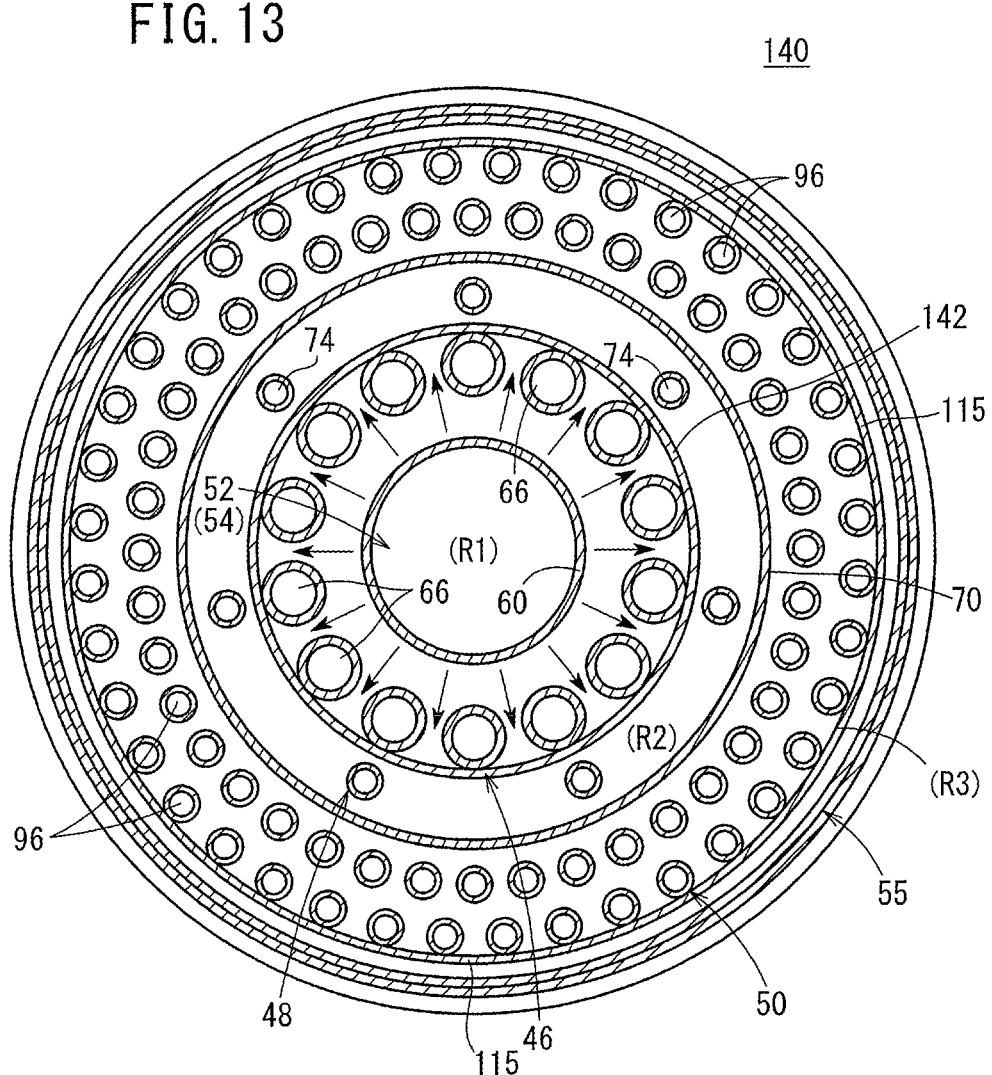
FIG. 13 is a cross sectional plan view showing the fuel cell module.

As shown in FIGS. 11, 12, and 13, a fuel cell module 140 according to a third embodiment of the present invention includes a circumscribed non-uniform flow suppression plate 142 provided in the second area R2 where the reformer 46 and the evaporator 48 are provided. The circumscribed non-uniform flow suppression plate 142 has a cylindrical shape provided along the minimum circumscribed circle which is tangent to the outer surfaces of a plurality of reforming pipes 66 of the reformer 46.

The upper end of the circumscribed non-uniform flow suppression plate 142 is fixed to the first upper ring member 68b, and the lower end of the circumscribed non-uniform flow suppression plate 142 is spaced upward from the first lower ring member 68a by a predetermined distance h3 (see FIG. 11). The circumscribed non-uniform flow suppression plate 142 may be provided along the minimum circumscribed circle which is tangent to the outer surfaces of the plurality of evaporation pipes 74 of the evaporator 48.

In the third area R3, the circumscribed non-uniform flow suppression plate 115 is provided. However, this circumscribed non-uniform flow suppression plate 115 may be dispensed with as necessary. Alternatively, instead of the circumscribed non-uniform flow suppression plate 115, the first circumscribed non-uniform flow suppression plate 132 and the second circumscribed non-uniform flow suppression plate 134 according to the second embodiment may be provided.

In the third embodiment, the combustion gas moves from the first area R1 to the second area R2 through a plurality of holes 60a. Then, the combustion gas is blown onto the circumscribed non-uniform flow suppression plate 142. Therefore, the combustion gas moves along the circumscribed non-uniform flow suppression plate 142 in the direction indicated by the arrow Ld, and the combustion gas is blown onto each of the reforming pipes 66 which are tangent to the circumscribed non-uniform flow suppression plate 142.

In the structure, after the combustion gas flows into the second area R2, by the guidance of the circumscribed non-uniform flow suppression plate 142, the combustion gas flows along the outer surfaces of the reforming pipes 66 in the axial direction suitably. Thus, non-uniform flow and blow-through of the combustion gas are suppressed suitably, and the channel of the combustion gas can be sufficiently long. Accordingly, the same advantages as in the case of the first and second embodiments are obtained. For example, the quantity of the heat passed from the combustion gas to the reforming gas is increased, and improvement in the heat exchange efficiency is achieved suitably.

Figure 14:
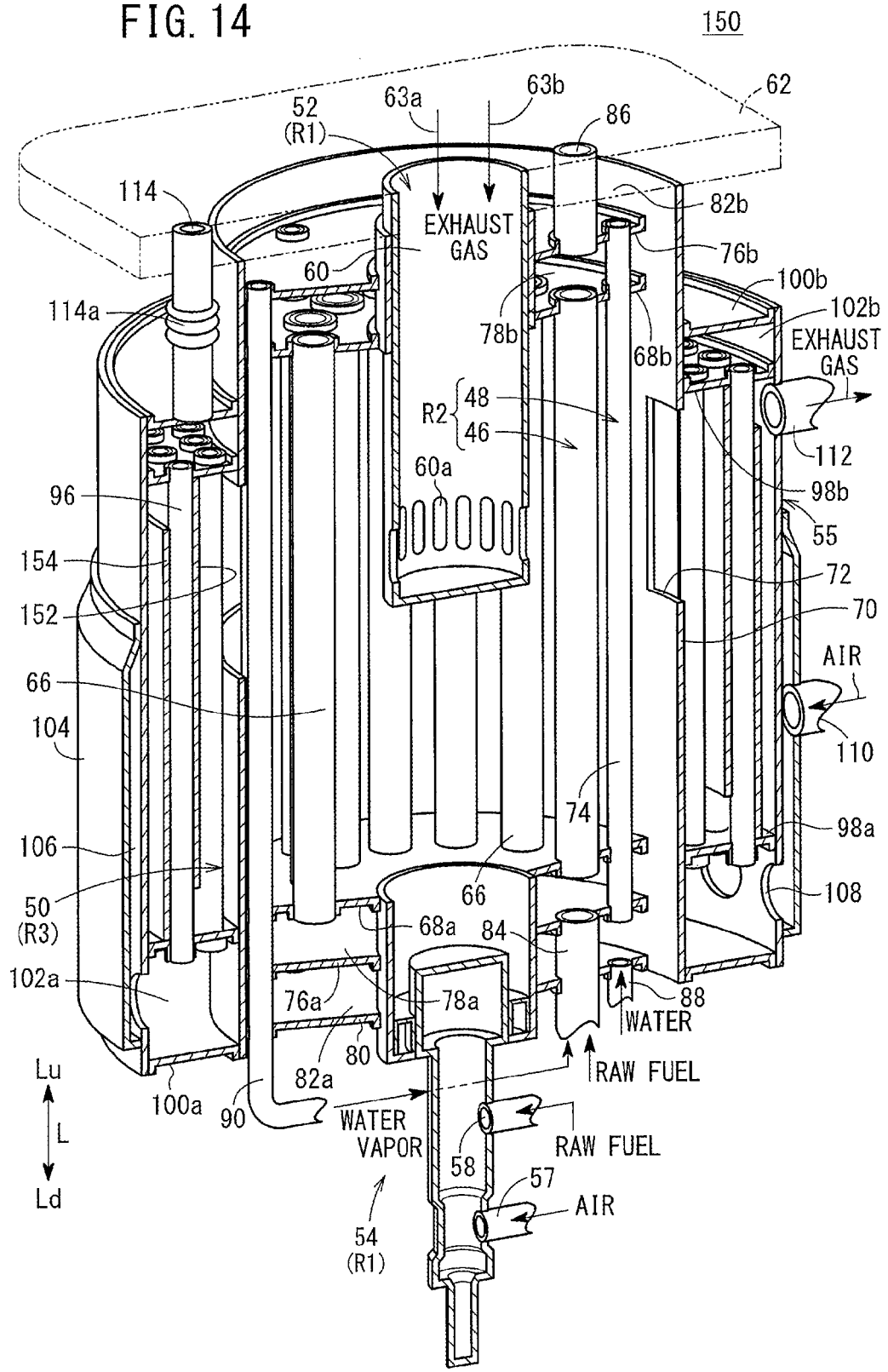
FIG. 14 is a perspective view with partial omission showing a fuel cell module according to a fourth embodiment of the present invention.
Figure 15:
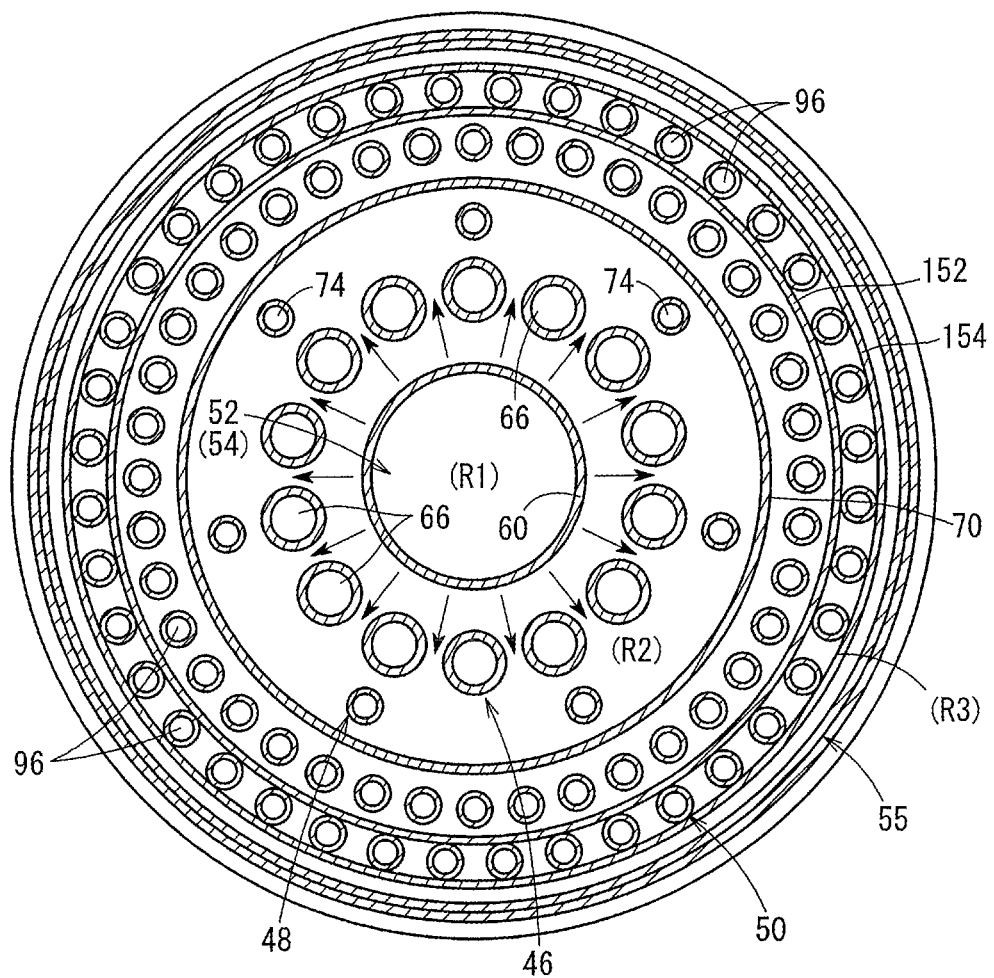
FIG. 15 is a cross sectional plan view showing the fuel cell module.

As shown in FIGS. 14 and 15, a fuel cell module 150 according to a fourth embodiment of the present invention includes an inscribed non-uniform flow suppression plate 152 and a circumscribed non-uniform flow suppression plate 154 provided in the third area R3 where the heat exchanger 50 is provided. One or two inscribed non-uniform flow suppression plates 152 are provided along the maximum inscribed circle(s) which is tangent to the outer surfaces of a plurality of outer (or inner or both of outer and inner) heat exchange pipes 96. One or two circumscribed non-uniform flow suppression plates 154 are provided along the minimum circumscribed circle(s) which is tangent to the outer surfaces of the plurality of outer (or inner or both of outer and inner) heat exchange pipes 96.

The inscribed non-uniform flow suppression plate 152 has a cylindrical shape. As shown in FIG. 14, an upper end of the inscribed non-uniform flow suppression plate 152 is fixed to an upper ring member 98*b*, and a lower end of the inscribed non-uniform flow suppression plate 152 is spaced upward from a lower ring member 98*a*. A lower end of the circumscribed non-uniform flow suppression plate 154 is fixed to the lower ring member 98*a*, and an upper end of the circumscribed non-uniform flow suppression plate 154 is spaced downward from the upper ring member 98*b*.

In the fourth embodiment, in the third area R3 where the heat exchanger 50 is provided, the circumscribed non-uniform flow suppression plate 154 is provided along the minimum circumscribed circle which is tangent to the outer surfaces of the plurality of heat exchange pipes 96, and the inscribed non-uniform flow suppression plate 152 is provided along the maximum inscribed circle which is tangent to the outer surfaces of the heat exchange pipes 96. The positions of the ends of the circumscribed non-uniform flow suppression plate 154 and the inscribed non-uniform flow suppression plate 152 are offset from each other (i.e., the ends are arranged in a staggered manner) in the pipe length direction.

In the structure, as shown in FIGS. 14 and 15, the combustion gas flows into the third area R3, and flows downward along the inscribed non-uniform flow suppression plate 152. Thereafter, the combustion gas flows below the inscribed non-uniform flow suppression plate 152, and the combustion gas is blown onto the circumscribed non-uniform flow suppression plate 154. Then, the combustion gas flows along a flow channel formed between the circumscribed non-uniform flow suppression plate 154 and the inscribed non-uniform flow suppression plate 152 in the direction indicated by the arrow Lu, and the combustion gas is blown onto the outer surfaces of the heat exchange pipes 96.

Thus, non-uniform flow and blow-through of the combustion gas supplied to the heat exchanger 50 are suppressed suitably, and the combustion gas flows along the heat exchange pipes 96 still more smoothly and reliably. Accordingly, the same advantages as in the cases of the first to third embodiments are obtained. For example, the quantity of the heat passed from the combustion gas to the oxygen-containing gas is increased, and improvement in the heat exchange efficiency is achieved suitably.

Figure 16:
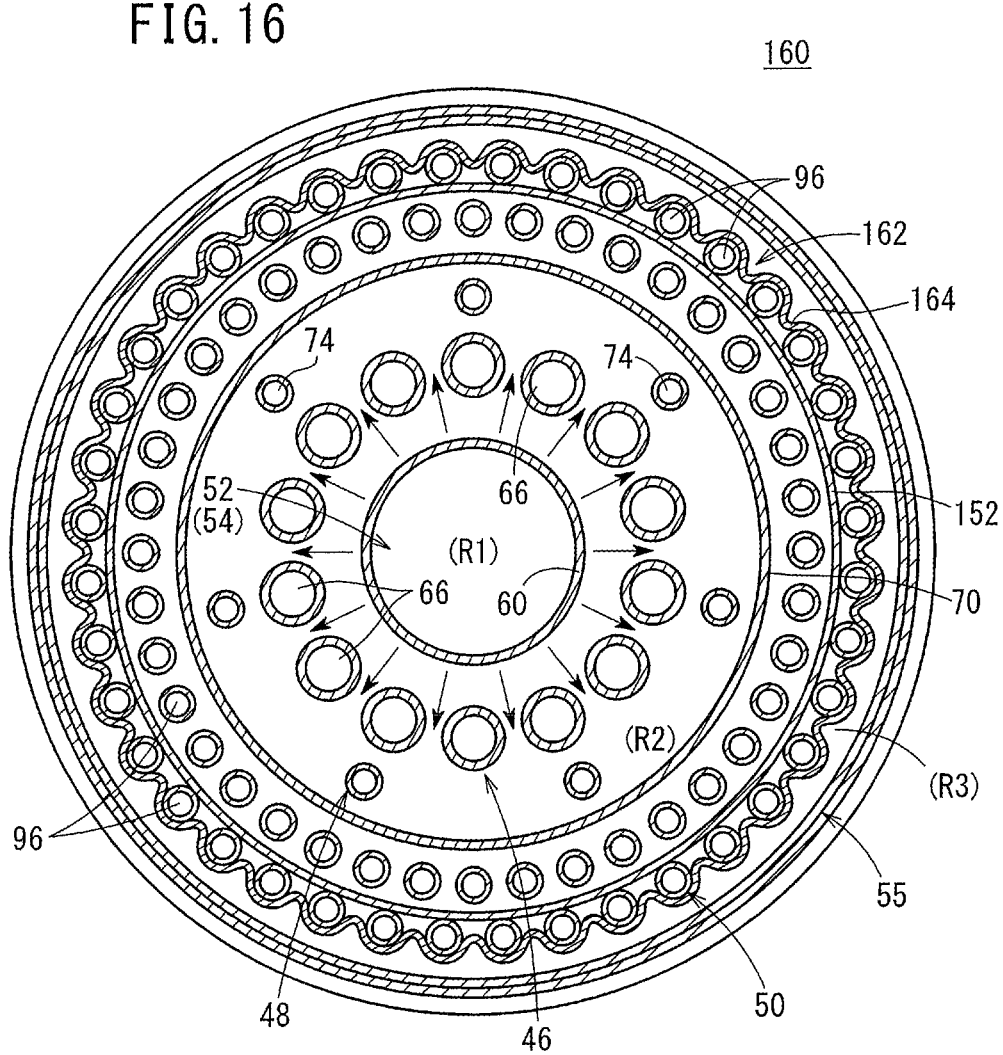
FIG. 16 is a cross sectional plan view showing a fuel cell module according to a fifth embodiment of the present invention.

As shown in FIG. 16, a fuel cell module 160 according to a fifth embodiment of the present invention includes an inscribed non-uniform flow suppression plate 152 and a circumscribed non-uniform flow suppression plate 162 provided in the third area R3 where the heat exchanger 50 is provided.

Figure 17:
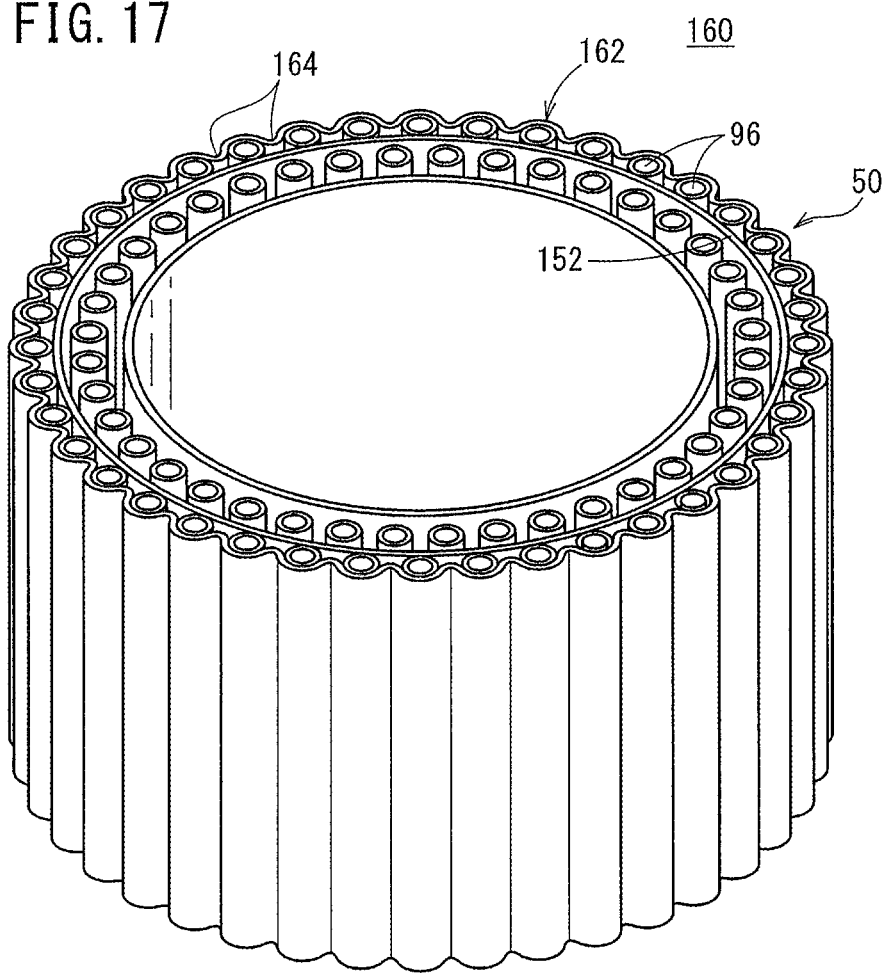
FIG. 17 is a perspective view showing main components of a heat exchanger of the fuel cell module.
Figure 18:
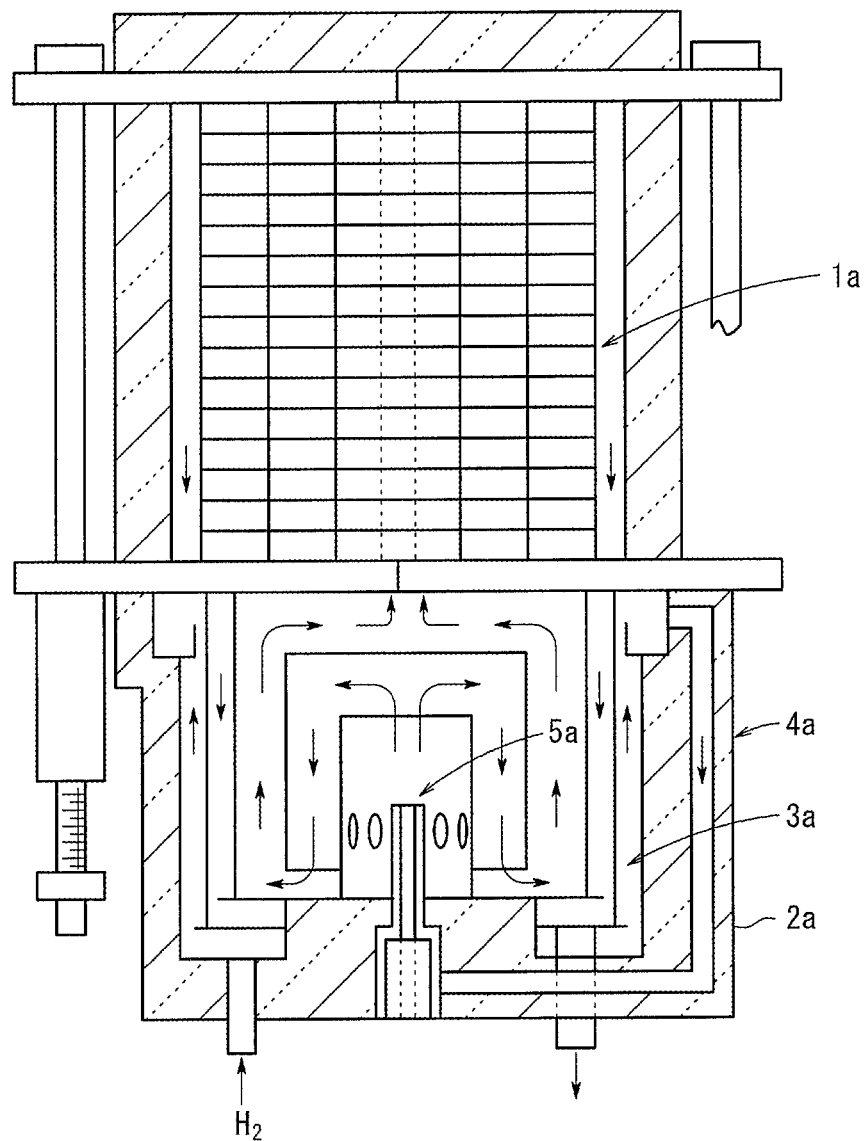
FIG. 18 is a view schematically showing a fuel cell battery disclosed in a conventional technique 1.
Figure 19:
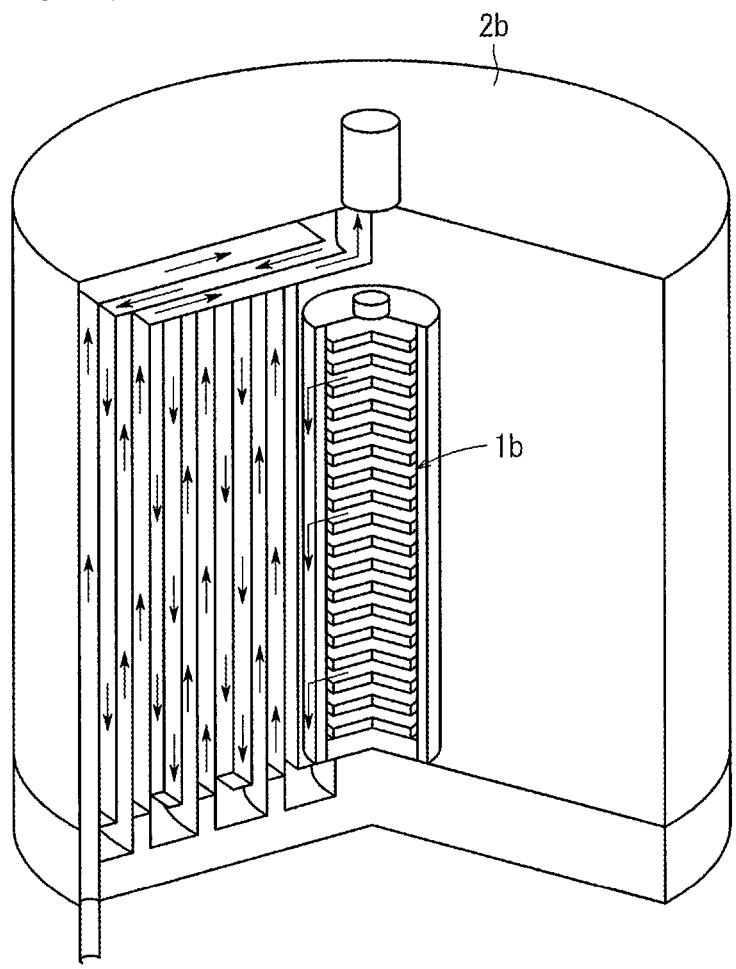
FIG. 19 is a perspective view with partial cutout showing a solid oxide fuel cell disclosed in a conventional technique 2.
Figure 20:
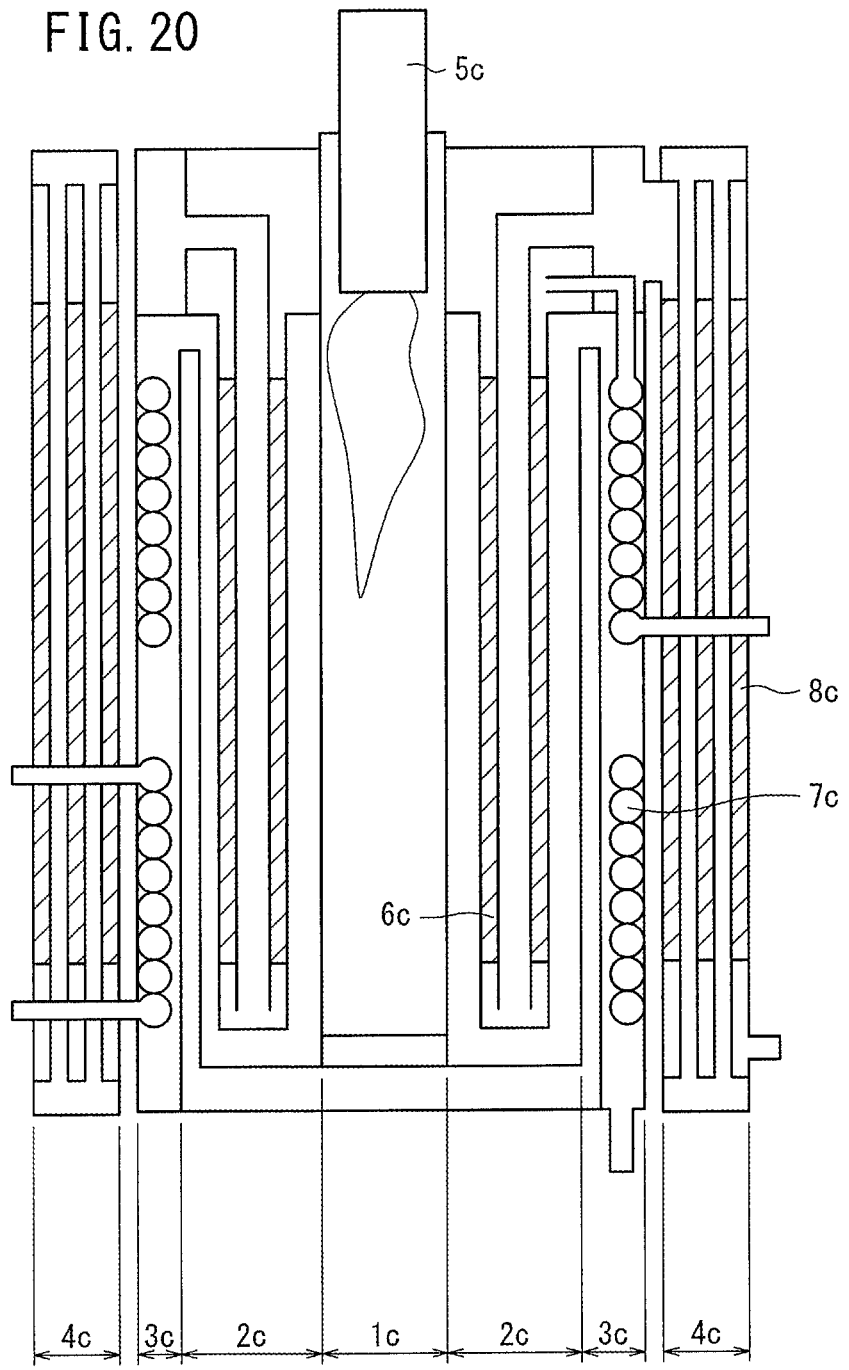
FIG. 20 is a view schematically showing a fuel cell system disclosed in a conventional technique 3.

As shown in FIGS. 16 and 17, the circumscribed non-uniform flow suppression plate 162 is provided along the minimum circumscribed circle which is tangent to the outer surfaces of a plurality of heat exchange pipes 96, and includes inner protrusions 164 protruding between the heat exchange pipes 96. The inner protrusions 164 protrude to the circumference of a virtual circle connecting the centers of the heat exchange pipes 96, or to near the circumference, so that the circumscribed non-uniform flow suppression plate 162 contacts the outer surfaces of the heat exchange pipes 96 over the range of about 180°.

The cross sectional area of a combustion gas flow opening formed by the circumscribed non-uniform flow suppression plate 162, the inscribed non-uniform flow suppression plate 152, and the outer surfaces of the heat exchange pipes 96, and the total sectional area of the heat exchange pipes 96 are set to be the same.

In the fifth embodiment, the circumscribed non-uniform flow suppression plate 162 has a substantially wavy shape, and contacts the outer surfaces of the heat exchange pipes 96. Therefore, further improvement in the efficiency of heat exchange between the combustion gas and the oxygen-containing gas is achieved suitably. Further, since the cross sectional area of the combustion gas flow opening and the total cross sectional area of the heat exchange pipes 96 are set to be the same, improvement in the heat exchange efficiency is achieved, and thermally self-sustaining operation is facilitated.

Though the fifth embodiment is applied to the outer heat exchange pipes 96 of the heat exchanger 50, the present invention is not limited in this respect. The fifth embodiment may be applied to the inner heat exchange pipes 96. Further, the above structure may be applicable to the reformer 46 and the evaporator 48.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of water vapor and a raw fuel chiefly containing hydrocarbon to produce the fuel gas supplied to the fuel cell stack;
an evaporator for evaporating water and supplying the water vapor to the reformer;
a heat exchanger for raising a temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas,
wherein the fuel cell module includes:
a first area where the exhaust gas combustor and the start-up combustor are provided;
an annular second area around the first area and where the reformer and the evaporator are provided; and
an annular third area around the second area and where the heat exchanger is provided,
wherein the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber and another end connected to the oxygen-containing gas discharge chamber, and a combustion gas channel for supplying the combustion gas to spaces between the heat exchange pipes; and
a circumscribed non-uniform flow suppression plate is provided along a minimum circumscribed circle which is tangent to outer surfaces of the plurality of heat exchange pipes.

2. The fuel cell module according to claim 1, wherein the reformer includes an annular mixed gas supply chamber to which the mixed gas is supplied, an annular fuel gas discharge chamber to which the produced fuel gas is discharged, a plurality of reforming pipes each having one end connected to the mixed gas supply chamber and another end connected to the fuel gas discharge chamber, and a combustion gas channel for supplying the combustion gas to spaces between the reforming pipes; and
a circumscribed non-uniform flow suppression plate is provided along a minimum circumscribed circle which is tangent to outer surfaces of the plurality of reforming pipes.

3. The fuel cell module according to claim 1, wherein the evaporator includes an annular water supply chamber to which the water is supplied, an annular water vapor discharge chamber to which the water vapor is discharged, a plurality of evaporation pipes each having one end connected to the water supply chamber and another end connected to the water vapor discharge chamber, and a combustion gas channel for supplying the combustion gas to spaces between the evaporation pipes; and
a circumscribed non-uniform flow suppression plate is provided along a minimum circumscribed circle which is tangent to outer surfaces of the plurality of evaporation pipes.

4. The fuel cell module according to claim 1, wherein an inscribed non-uniform flow suppression plate is provided along a maximum inscribed circle which is tangent to the outer surfaces.

5. The fuel cell module according to claim 4, wherein positions of ends of the circumscribed non-uniform flow suppression plate and the inscribed non-uniform flow suppression plate are offset from each other in a pipe length direction; and
the combustion gas flows between the circumscribed non-uniform flow suppression plate and the inscribed non-uniform flow suppression plate in the pipe length direction.

6. The fuel cell module according to claim 5 wherein, of the inscribed non-uniform flow suppression plate and the circumscribed non-uniform flow suppression plate, one that is provided at a position closest to the center of the first area is positioned on a side closer to the exhaust gas combustor in the pipe length direction.

7. The fuel cell module according to claim 1, wherein the fuel cell module is a solid oxide fuel cell module.

* * * * *